United States Patent
Zaima

(10) Patent No.: US 7,187,879 B2
(45) Date of Patent: Mar. 6, 2007

(54) IMAGE FORMING APPARATUS

(75) Inventor: Nobuhiko Zaima, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 11/016,881

(22) Filed: Dec. 21, 2004

(65) Prior Publication Data

US 2005/0190386 A1    Sep. 1, 2005

(30) Foreign Application Priority Data

Dec. 24, 2003    (JP)    ............................. 2003-428473

(51) Int. Cl.
  *G03G 15/00*    (2006.01)
(52) U.S. Cl. .......................................... 399/49; 399/72
(58) Field of Classification Search ................ 399/38, 399/39, 40, 41, 46, 49, 72; 347/14; 358/3.1
  See application file for complete search history.

(56) References Cited

U.S. PATENT DOCUMENTS 6,515,769 B1 *   2/2003   Ikeda et al. .................. 358/3.1
6,516,163 B2 *   2/2003   Nakai et al. ................... 399/49
6,529,694 B1 *   3/2003   Fukaya et al. ................ 399/46
6,585,340 B1 *   7/2003   Borrell ......................... 347/14

FOREIGN PATENT DOCUMENTS

| JP | 2-129674 | 5/1990 |
|---|---|---|
| JP | 4-127172 | 4/1992 |
| JP | 7-230213 | 8/1995 |
| JP | 8-123110 | 5/1996 |
| JP | 11-258931 | 9/1999 |

* cited by examiner

*Primary Examiner*—Hoan Tran
(74) *Attorney, Agent, or Firm*—Fitzpatrick, Cella, Harper & Scinto

(57) ABSTRACT

At power-on, an image forming apparatus is in a state after it is leftstanding for some time in many cases, so that an image characteristic is largely different from that when γLUT correction table is prepared by an immediately before correction and is close to that at the time of previous power-on. For this reason, image formation is judged whether it is first image formation after power-on or not (S21), and in the case of the first image formation, the γLUT correction table is replaced with an original γLUT correction table at the time of previous power-on (S22). In the case where the image formation is not the first image formation, the immediately before γLUT correction table obtained after power-on is used as it is. As a result, it becomes possible to stabilize a density or coloring of a first image after power-on while reducing a warm-up time immediately after power-on.

9 Claims, 25 Drawing Sheets

IMAGE FORMING APPARATUS

FIELD OF THE INVENTION AND RELATED ART

The present invention relates to image forming apparatuses such as a printer, a copying machine, and a facsimile machine.

As a method of adjusting an image processing characteristic (hereinafter referred to as an "image control method") in the image forming apparatuses such as the printer, the copying machine, and the facsimile machine (e.g. described in Japanese Laid-Open Patent Application Hei 11-258931), the following methods have been known.

One of the methods is a method wherein a specific pattern is formed on an image bearing member such as a drum-type electrophotographic photosensitive member (hereinafter referred to as a "photosensitive drum") after completion of a warm-up operation, and a formed pattern density is read to change an operation of a circuit, for determining an image forming condition, such as γ (gamma)-correction circuit on the basis of the read density value, thus stabilizing a quality of an image to be formed.

There is also a method wherein a specific pattern is formed and read again on an image bearing member even when a gradation characteristic of an image forming apparatus is changed due to a fluctuation in environmental condition, and information on the pattern is fed back again to a circuit, for determining an image forming condition, such as γ-correction circuit, thereby to stabilize an image quality depending on a fluctuation in environmental condition.

Further, a method of performing the above described controls in each image forming operation or at the time of each completion of the image forming operation has also been known in order to further stabilize the image quality.

Further, in the case where an image forming apparatus is used for a long period of time, a density red from a pattern on an image bearing member and a density of an actual print-out image do not coincide with each other in some cases. For this reason, such a method that a specific pattern is formed on a recording material and an image forming condition is corrected based on a density value of the pattern, has been proposed.

However, the above described methods requires much time and effort for control, so that when the control is performed after warm-up of the image forming apparatus, a time from power-on of the image forming apparatus to when the image forming apparatus is placed in an operable state is increased.

For this reason, there is such a method that the control is not performed after warm-up but is then performed during or at the time of completing the image forming operation. However, this method has accompanied with such a problem that a density or coloring of a first image after power-on is not ensured.

SUMMARY OF THE INVENTION

An object of the present invention is to provide an image forming apparatus capable of improving a quality of an image obtained through first image formation while shortening a time from power-on to completion of the first image formation as much as possible.

Another object of the present invention is to provide an image forming apparatus capable of stabilizing a density and coloring of an image obtained through first image formation while shortening a time from power-on to completion of the first image formation as much as possible.

According to an aspect of the present invention, there is provided an image forming apparatus, comprising:
  image forming means for forming an image pattern on the basis of image data;
  detection means for detecting a characteristic of the image pattern formed by the image forming means;
  control means for controlling an image forming condition depending on the characteristic of the image pattern detected by the detection means; and
  storing means for storing the characteristic of the image pattern detected from completion of first image formation after a main power source is turned on, to before start of (n)th image formation for a predetermined time, where n is a predetermined integer;
  wherein the control means control the image forming condition on the basis of information stored in the storing means when first image formation is performed after the main power source is turned on.

According to another aspect of the present invention, there is provided an image forming apparatus, comprising:
  image forming means for forming an image pattern on the basis of image data;
  detection means for detecting a characteristic of the image pattern formed by the image forming means;
  control means for controlling an image forming condition depending on the characteristic of the image pattern detected by the detection means; and
  storing means for storing the characteristic of the image pattern detected by the detection means;
  wherein the control means controls the image forming condition on the basis of a characteristic of an image pattern detected under an ambient environmental condition equivalent to that when the main power source is turned on for current image formation, after the main power source is turned on for previous image formation when first image formation is performed after the main power source is turned on.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 10(a) to 10(e) are views showing another display embodiment of the display device with respect to the test print 1.

FIG. 27 is a flow chart showing a processing with respect to image formation after power-on.

FIGS. 29 and 30 are flow charts each showing a processing with respect to first image formation (image formation on a first sheet) after power-on.

DETAILED DESCRIPTION OF THE PREFERRED EMBODIMENTS

Hereinbelow, embodiments of the present invention will be described with reference to the drawings. In the respective figures, members or means indicated by identical signs have the same structures or functions, so that repetitive explanation thereof is appropriate omitted.

First Embodiment (General Structure of Image Forming Apparatus)

Figure 1:
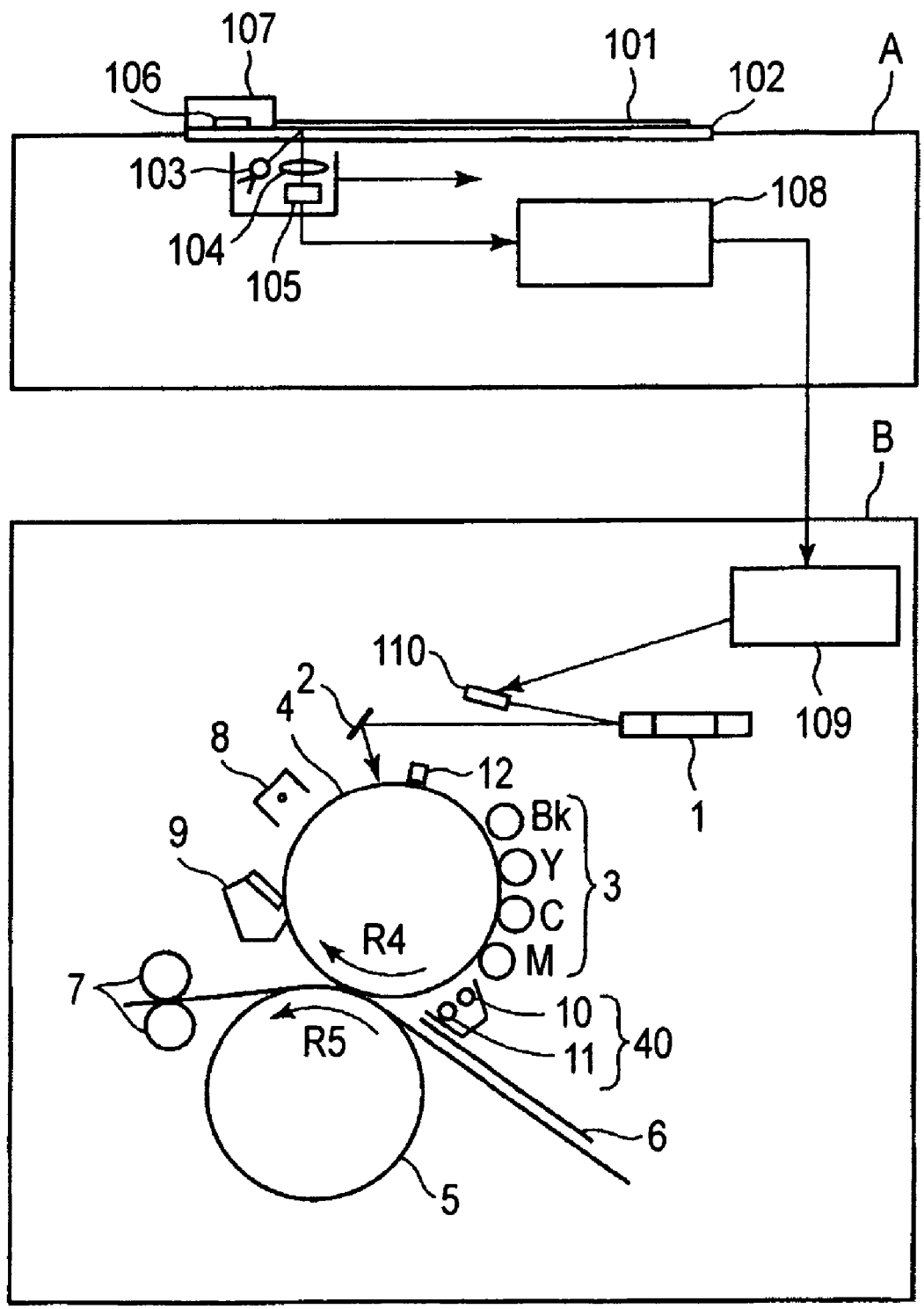
FIG. 1 is a longitudinal sectional view schematically showing a structure of according to an embodiment of the image forming apparatus of the present invention.

FIG. 1 is a schematic longitudinal sectional view showing an embodiment of the image forming apparatus according to the present invention.

The image forming apparatus shown in FIG. 1 is an electrophotographic-type four-color full color copying machine (hereinafter referred to as an "image forming apparatus") which includes a reader unit A for reading an original image and a printer unit B disposed below the reader unit A. Hereinafter, the reader unit A, the printer unit B, and the image forming apparatus will be described in this order.

Reader Unit A

As shown in FIG. 1, an original 101 is placed face-down on an original supporting glass plate 102 of the reader unit A and is irradiated with light by a light source 103. Reflected light from the original 101 forms an image in a charge-coupled device (CCD) sensor 105 via an optical system 104. The CCD sensor 105 includes three groups of line sensors of red (R), green (G) and blue (B) arranged in three parallel rows, and color component signals of red, blue and green are generated for corresponding line sensor groups, respectively. These reading optical system (unit) is moved in directions of arrows indicated in FIG. 1 and converts the image of the original 101 into electric signals for respective lines.

On the glass plate 102, a positioning member 107 for preventing oblique arrangement of the original 101 by abutting one side of the original 101 against the positioning member 107 and a reference white plate 106 for effecting a shading correction in a thrust direction of the CCDE sensor 105 are disposed.

Image signals obtained by the CCD sensor 105 are image-processed by an image processing unit (reader image processing unit) 108 and sent to the printer unit B, thus being processed by a printer control portion (control means) 109.

Figure 2:
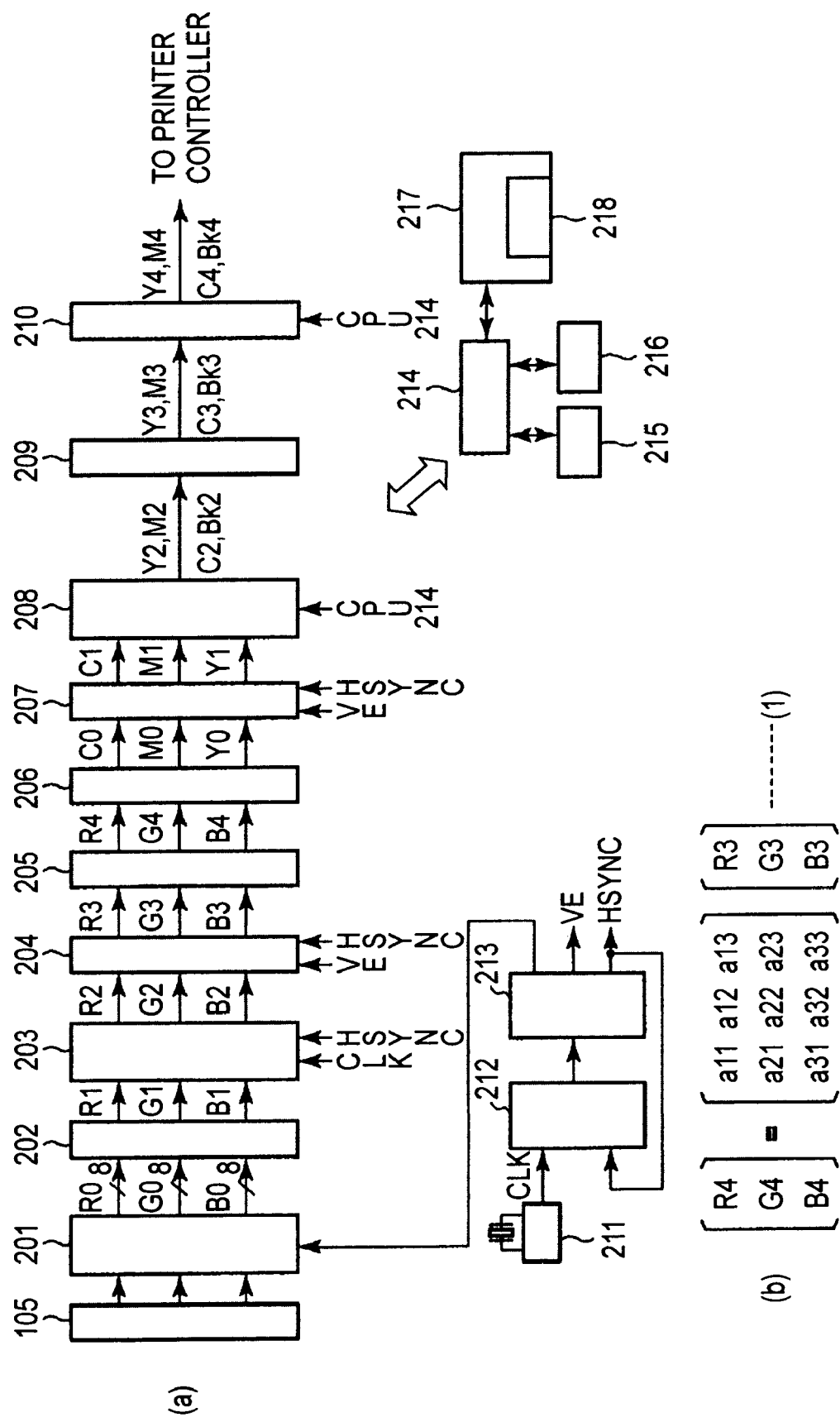
FIGS. 2(a) and 2(b) are block diagrams showing flow of an image signal in a reader image processing unit.

FIG. 2(a) is a block diagram showing flow of the image signal processed by the image processing unit (control means) 108.

As shown in FIG. 2(a), the image signals outputted from the CCD sensor 105 are inputted into an analog signal processing circuit 201 in which gain and offset are adjusted, and then are converted into digital image signals R1, G1 and B1 (8 bit for each color). These image signals R1, G1 and B1 are inputted into a shading correction circuit 203 in which a known shading correction using a reading signal of the reference white plate is performed for each color.

A block generation portion 211 generates clock CLK on one pixel bases. An address counter 212 counts the CLK and generates and outputs a main-scanning addressing signal for one line. A decoder 203 decodes the main-scanning addressing signal and generates CCD driving signals, on one line basis, such as a shift pulse and a reset pulse, a signal VE which represents an effective area in the reading signal for one line outputted from the CCD sensor 105, and a line (horizontal) synchronization signal HSYNC. The address counter 212 is cleared by HSYNC and then starts counting of a main-scanning address of a subsequent line.

The respective line sensors of the CCD sensor 105 are arranged with a predetermined spacing therebetween in a sub-scanning direction. For this reason, a spatial deviation in the sub-scanning direction is corrected by a line delay 204. More specifically, R signal and G signal are line-delayed in the sub-scanning direction relative to B-signal, whereby spatial positions of RGB signals are in agreement with each other.

An input masking circuit 205 converts a color space (reading color space), of the inputted image signal, determined by spectral characteristics of the RGB filters of the CCD sensor 105 into a predetermined color space (e.g., RGB or standard color of NTSC) through matrix operation according to an equation (1) shown in FIG. 1(b).

A LOG conversion circuit 206 is constituted by a look-up table ROM and converts luminance signals R4, G4 and B4 into density signals C0, M0 and Y0. A line delay memory 207 delays image signals C0, M0 and Y0 by a line delay from generation to output of determination signals, such as UCR, FILTER and SEN, from the image signals R4, G4 and B4, at a black character judgement portion (not shown).

A masking UCR circuit 208 extracts a black signal Bk from three primary color signals to be inputted therein, and effects an operation for correcting a difference from pure color of each coloring material for recording in the printer unit B, thereby to successively output image signals Y2, M2, C2 and Bk2 for each reading operation with a predetermined bit wide (e.g., 8 bits wide). A γ (gamma)-correction circuit 209 effects density correction of the image signals so as to match an ideal gradation characteristic of the printer unit B. Further, an output filter 210 effects edge enhancement or smoothing processing of the image signals.

The resultant frame-sequential image signals M4, C4, Y4 and Bk4 through these processings are sent to a printer controller 109 in which they are converted into pulse-width modulated pulse signals to permit density recording by the printer unit B.

Further, a CPU 214 performs control or image processing of the reader unit A by use of an RAM 215 as a working memory in accordance with a program stored in an ROM 216. An operator inputs instruction and processing condition into the CPU 214 through an operating portion 217. A display device 218 displays, e.g., an operation state of the image forming apparatus or the set processing condition.

Figure 3:
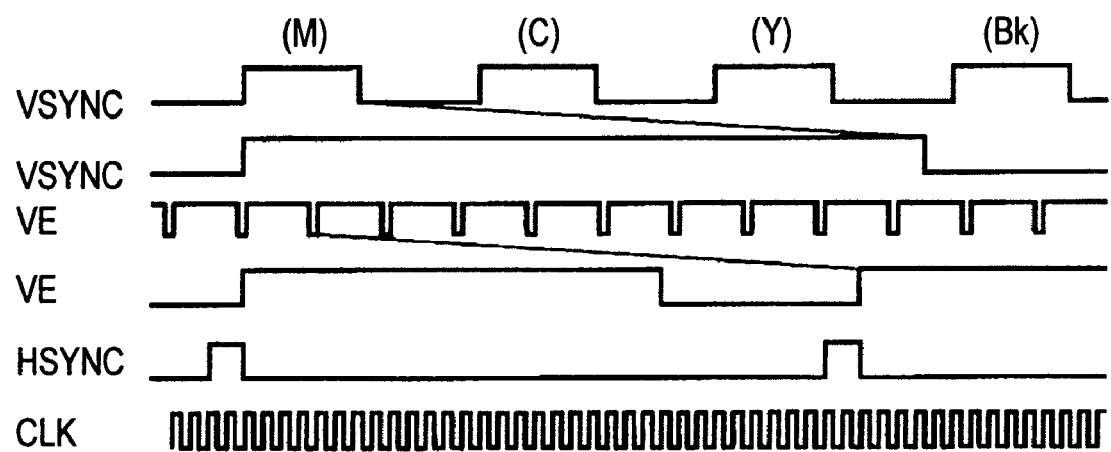
FIG. 3 is a timing chart of respective signals in the image processing unit.

FIG. 3 is a timing chart of the respective signals at the image processing portion 108.

In FIG. 3, VSYNC represents an effective image interval signal in the sub-scanning image interval signal in the sub-scanning direction, and performs image reading (scanning) at an interval of logic value "1" to generate successively output signals for M, C, Y and Bk. VE represents an effective image interval signal in the main-scanning direction, and provides a timing for a main-scanning start position during the interval of the logic value "1" to be principally subjected to line counting control for line delay. CLK represents a pixel synchronizing signal, which transmits image data at a rise timing from "0" to "1".

Printer Unit B

As shown in FIG. 1, the printer unit B Includes a photosensitive drum 4 as an image bearing member.

Figure 4:
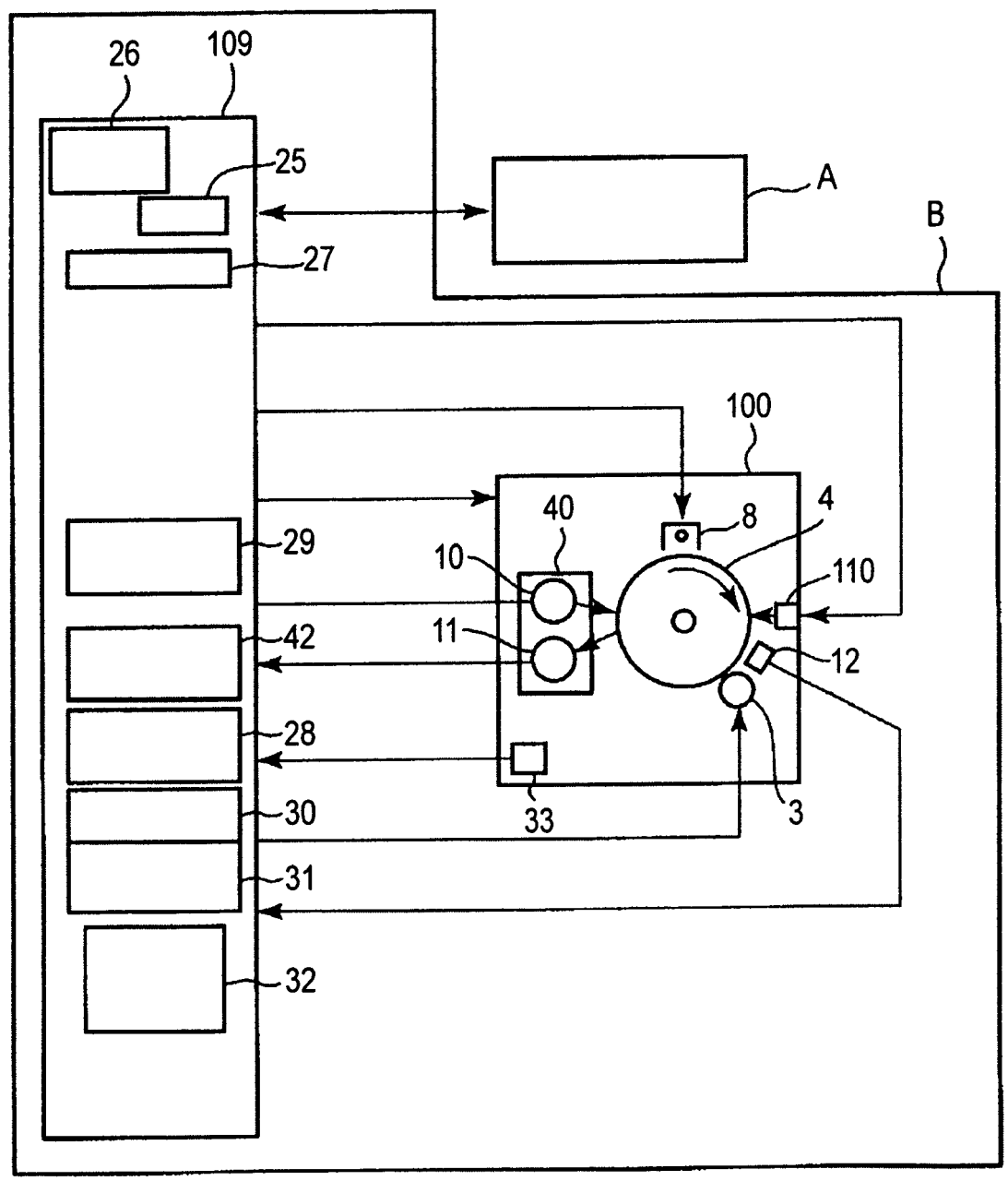
FIG. 4 is a block diagram showing an embodiment of a structure of a printer unit.

The photosensitive drum 4 is rotationally driven in a direction of an arrow R4 at a predetermined process speed (peripheral speed) by an unshown drive means, and the surface thereof is uniformly charged electrically to a predetermined polarity and a predetermined potential by a primary charger 8. A printer control unit 109 outputs a pulse signal depending on image data to be inputted by a laser driver 26 (FIG. 4). A laser light source (laser oscillation apparatus) 110 as an exposure apparatus outputs laser light depending on a pulse signal to be inputted. The laser light is reflected by a polygon mirror 1 and a mirror 2 to scan the surface of the photosensitive drum 4. By the scanning with the laser light, an electrostatic latent image is formed on the surface of the photosensitive drum 4.

The electrostatic latent image formed on the photosensitive drum 4 surface is developed with respective color toners for respective colors of a magenta (M), cyan (C), yellow (Y) and black (Bk). In this embodiment, around the photosensitive drum 4, respective color developing devices for Bk, Y, C and M are disposed in this order from an upstream side in a rotation direction of the photosensitive drum 4. Of these developing devices for four colors, a developing device for a color corresponding to an image forming color is brought near to the photosensitive drum 4 to deposit toner on the latent image, thus developing the latent image as a toner image (image picture).

A recording material (a recording medium such as sheet-like paper or a transparent film) is wound around a transfer drum 5 which is rotated one time in a direction of an arrow R5 for each color component, and is rotated four times in total, whereby the toner images are transferred and superposed. The recording material 6 is separated from the transfer drum 5 after completion of the transfer, and the toner image is fixed on the recording material under heating and pressure by a pair of fixing rollers 7, whereby four-color full color image print is completed.

Further, around the photosensitive drum 4, a surface potential sensor 12 for measuring a surface potential of the photosensitive drum 4 is disposed upstream from the developing devices 3, and a cleaner 9 for cleaning residual toner which has not been transferred is disposed upstream from the primary charger 8. Further, on the downstream side of the developing devices 3, an LED light source 10 and a photodiode 11 for detecting an amount of reflected light from a patch (a toner image for density detection) formed on the photosensitive drum 4 are disposed.

FIG. 4 is a block diagram showing a structural embodiment of the printer unit B.

The printer controller 109 includes a CPU 28, an ROM 30, an RAM 32, a test print storing portion 31, a density conversion circuit 42, an LUT (γLUT) 25, a laser driver 26, etc., and can communicate with the reader unit A and a printer engine 100. The CPU 28 controls a grid potential of the primary charger 8 or a developing bias (voltage) of the developing devices.

The printer engine 100 includes the photosensitive drum 4, a photosensor (detection means) 40 which includes the LED 10 and the photodiode 11, the primary charger 8, the laser light source 110, the surface potential sensor 12, the developing devices 3, etc. Further, the printer engine includes an environmental sensor 33 for measuring a moisture content (or a temperature and a humidity) in the air in the image forming apparatus.

Image Processing Unit

Figure 5:
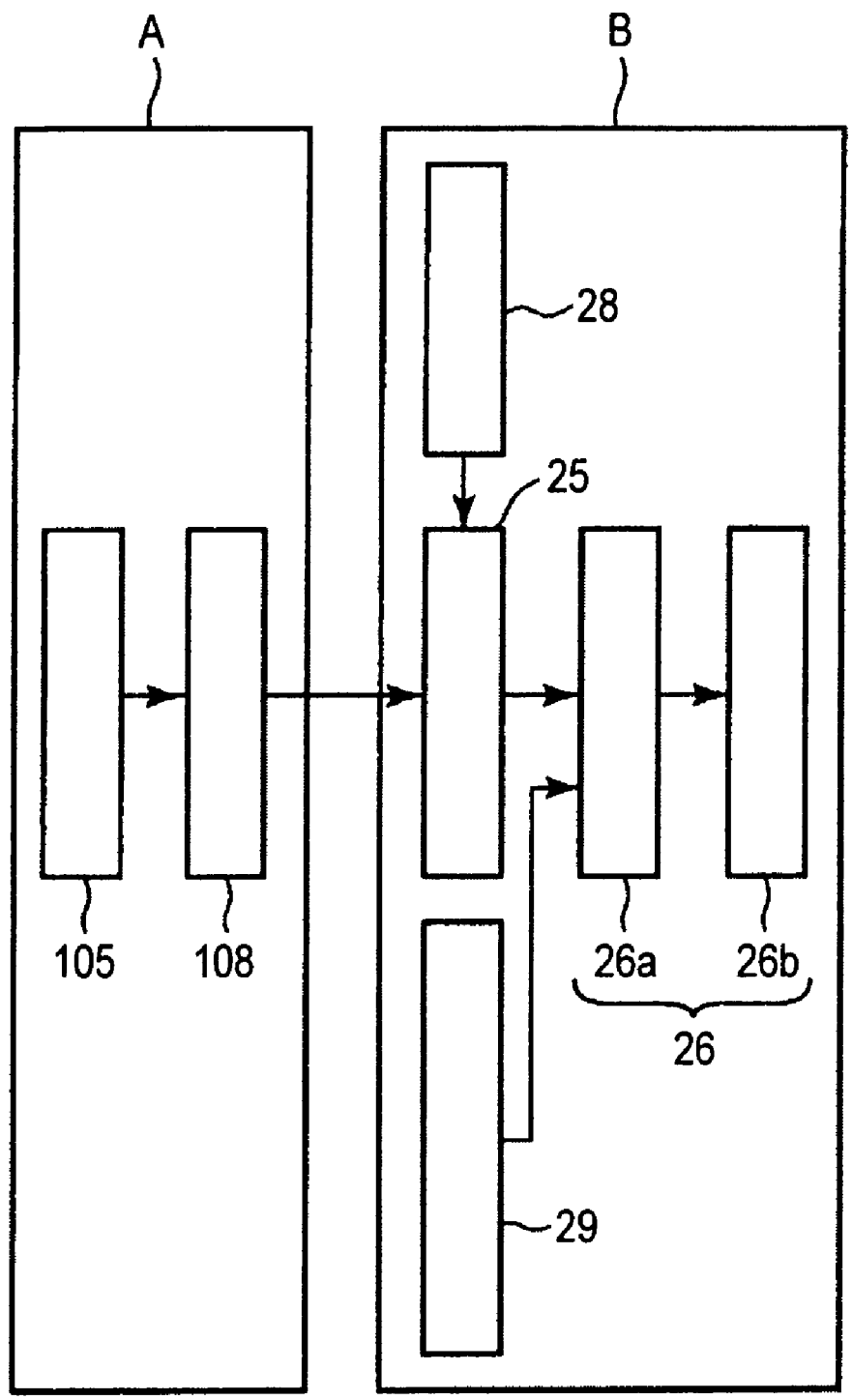
FIG. 5 is a block diagram showing an embodiment of a structure of an image processing unit for providing a gradation image.

FIG. 5 is a block diagram showing a structural embodiment of the image processing unit 108 for obtaining a gradation image.

A luminance signal obtained by the CCD sensor 105 is converted into a field (frame) sequential density signal in the image processing unit 108. A characteristic of the converted density signal is corrected by LUT (γLUT) 25 so that the signal becomes a signal corresponding to a gamma characteristic of the printer at the time of initial setting, i.e., so that an original image density and an output image density coincide with each other.

Figure 6:
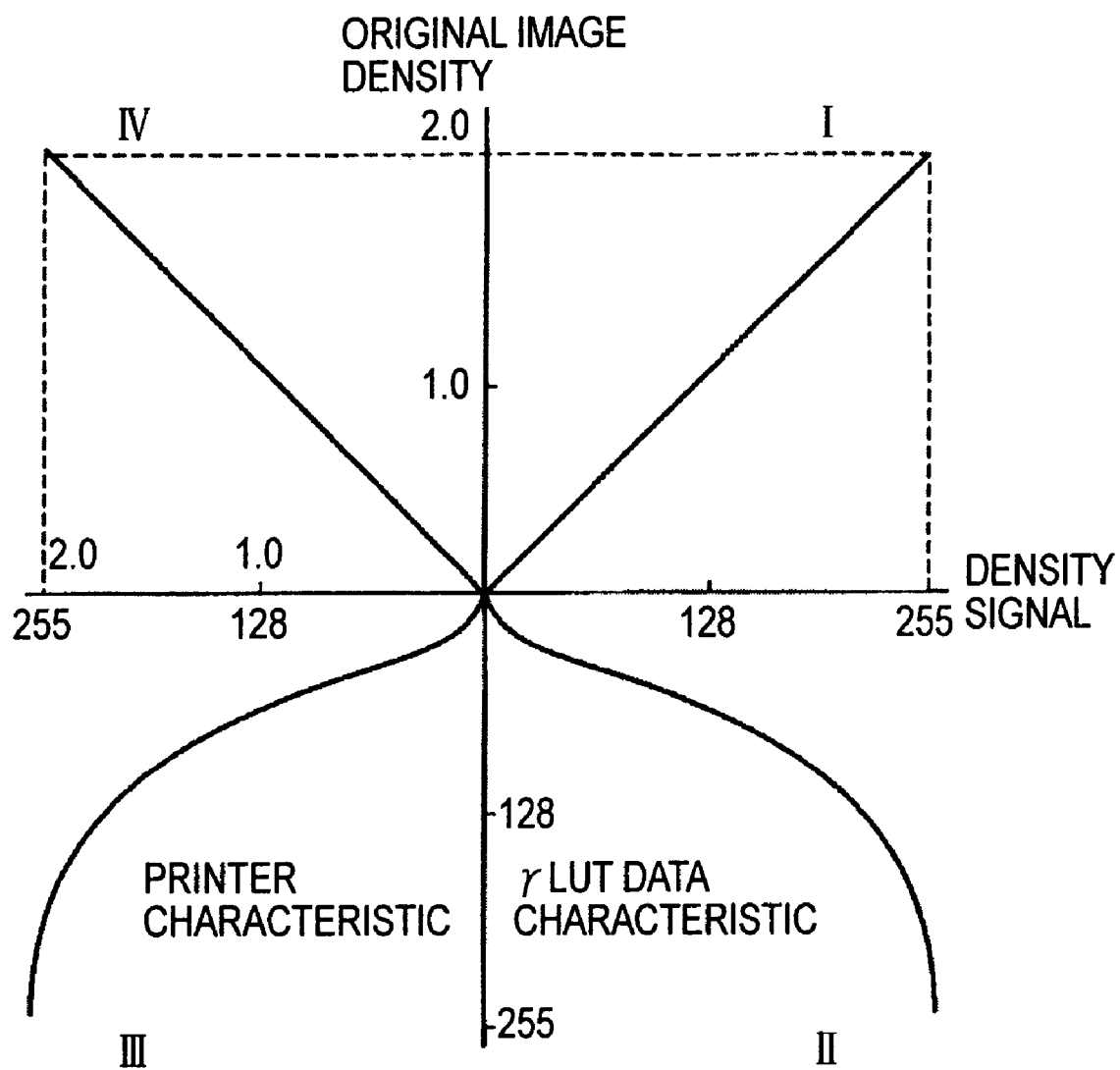
FIG. 6 is a graph for illustrating such a state that gradation is reproduced.

FIG. 6 is a chart showing such a state that a gradation level is represented. More specifically, a first quadrant (I) shows a reading characteristic of the reader unit A for converting the original image density into a density signal; a second quadrant (II) shows a conversion characteristic of the LUT 25 for converting the density signal to a laser output signal; a third quadrant (III) shows a recording characteristic of the printer unit B for converting the laser output signal to a density of output image; and a fourth quadrant (IV) shows a relationship between the density of the original image and the density of the output image. The entire chart shows a total gradation reproduction characteristic of the image forming apparatus shown in FIG. 1. In FIG. 6, the image processing is performed by 8-bit digital signals, thus being adopted in the case of 256 gradation levels.

In order to provide a linear total gradation characteristic of the image forming apparatus, i.e., a linear gradation characteristic in the fourth quadrant (IV), a degree of nonlinear printer characteristic in the third quadrant (III) is corrected by the LUT 25 in the second quadrant (II). The image signal having a gradation characteristic which has been converted based on the LUT 25 is converted into a pulse signal corresponding to a dot width by a pulse width modulation (PWM) circuit 26a of a laser driver 26 (FIG. 5), and sent to an LD driver 26b for coloring ON/OFF of a laser light source 110. In this embodiment, with respect to all the colors Y, M, C and Bk, a gradation reproducing method using pulse width modulation is employed.

On the photosensitive drum, an electrostatic latent image having such a predetermined gradation characteristic that a gradation level is colored by a change in dot area, is formed by scanning with laser light outputted from the laser light source 110. Thereafter, the gradation image is reproduced through the above described processes, such as the development, the transfer, and the fixation.

(First Control System)

Next, as image control for forming an image on the recording material 6, a first control system including both the reader unit A and the printer unit B will be described with reference to stabilization of image reproduction characteristic.

A control system for effecting calibration of the printer unit B by use of the reader unit A will be described.

Figure 7:
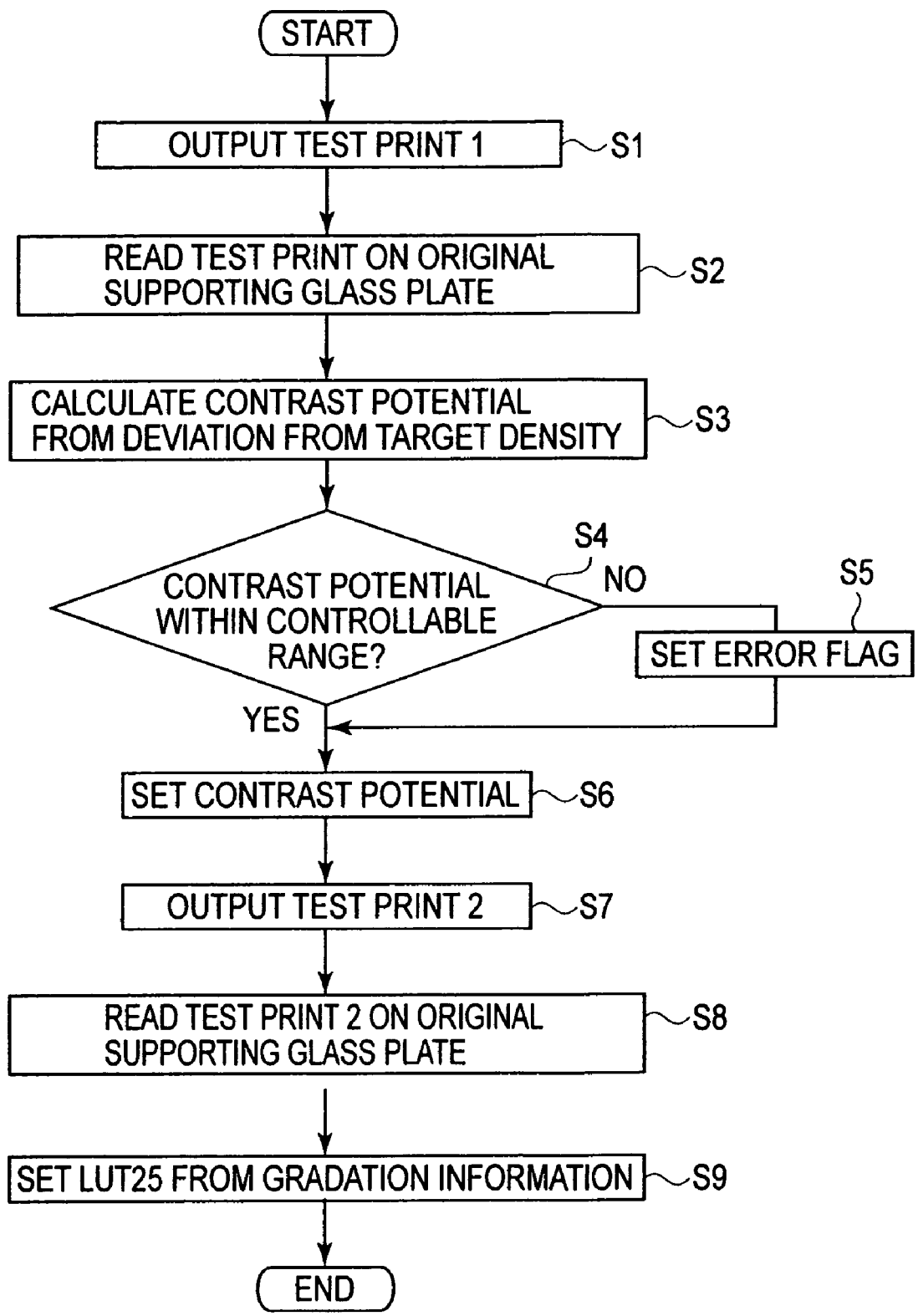
FIG. 7 is a flow chart showing an embodiment of calibration.

FIG. 7 is a flow chart showing an embodiment of the calibration. The calibration is realized by a cooperation of the CPU 214 for coloring the reader unit A and the CPU 28 for coloring the printer unit B.

Figure 8:
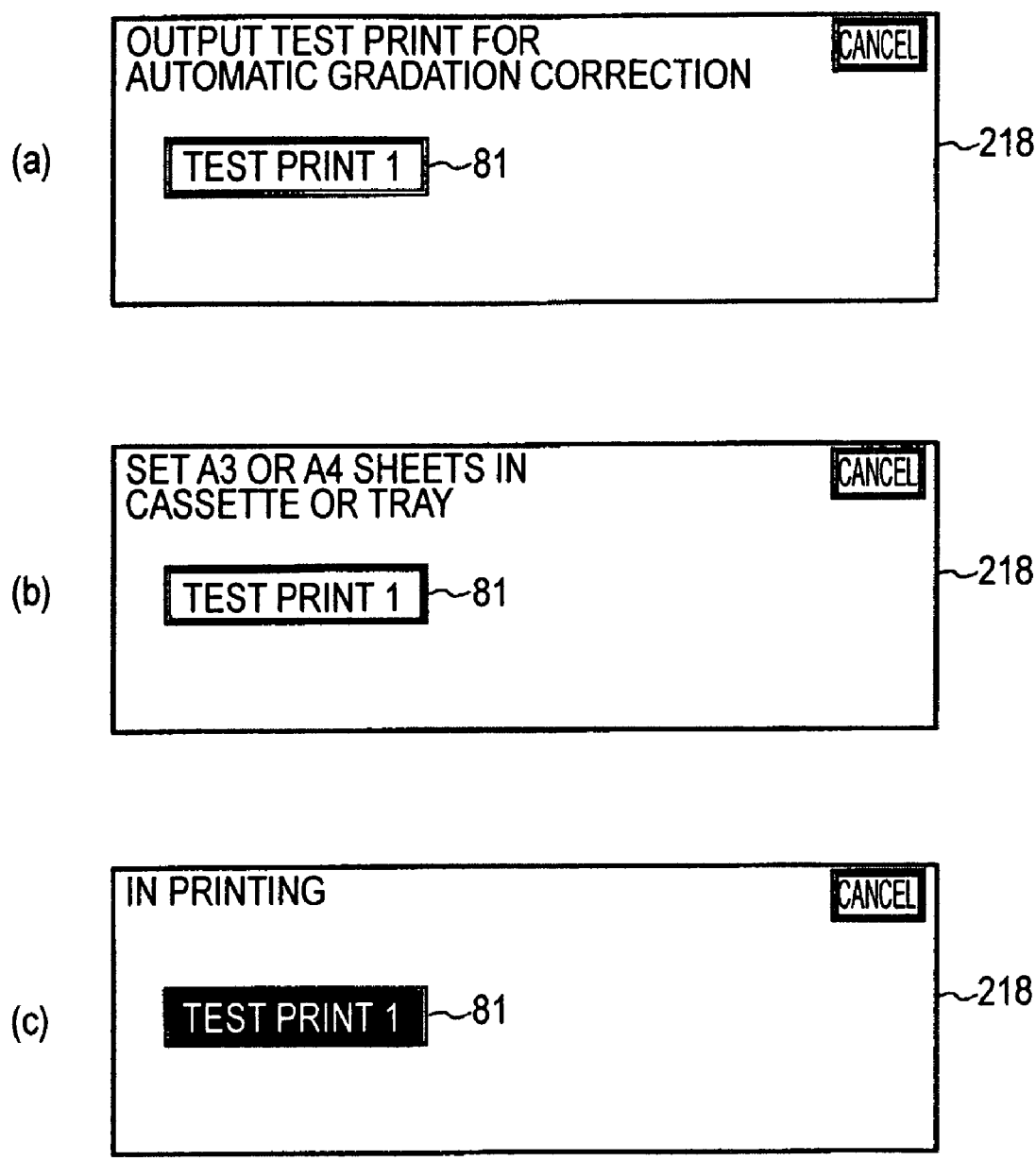
FIGS. 8(a) to 8(c) are views showing a display embodiment of a display device with respect to test print 1.
Figure 9:
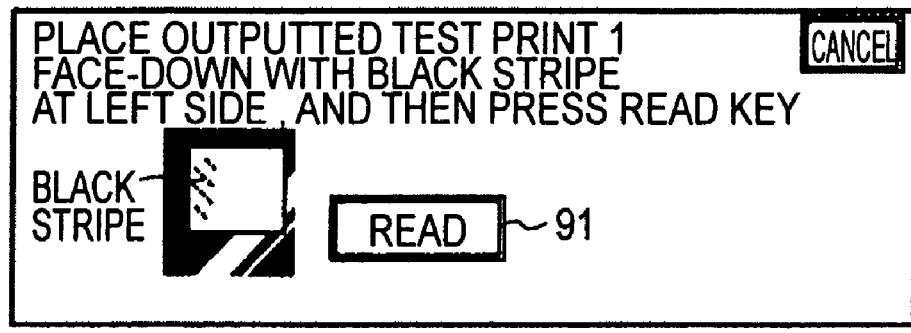
FIGS. 9(a) to 9(c) are views showing a display embodiment of the display device with respect to reading.
Figure 9:
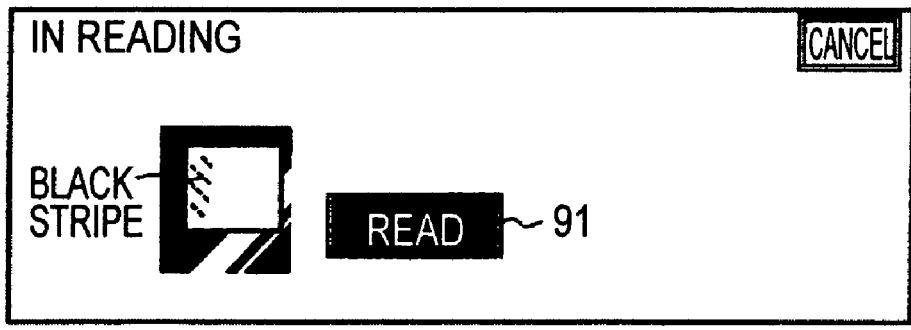
Figure 9:
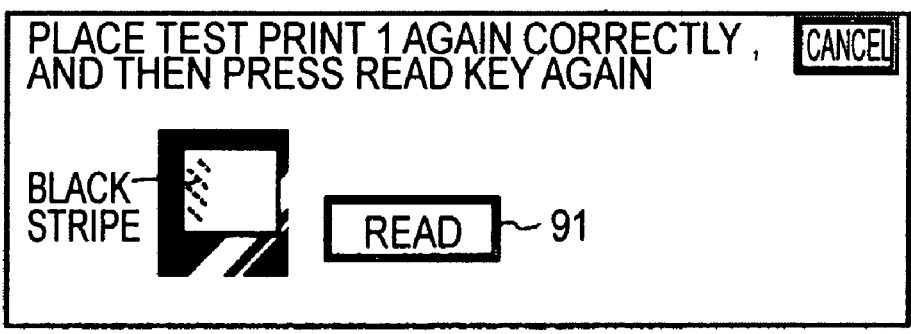
Figure 10:
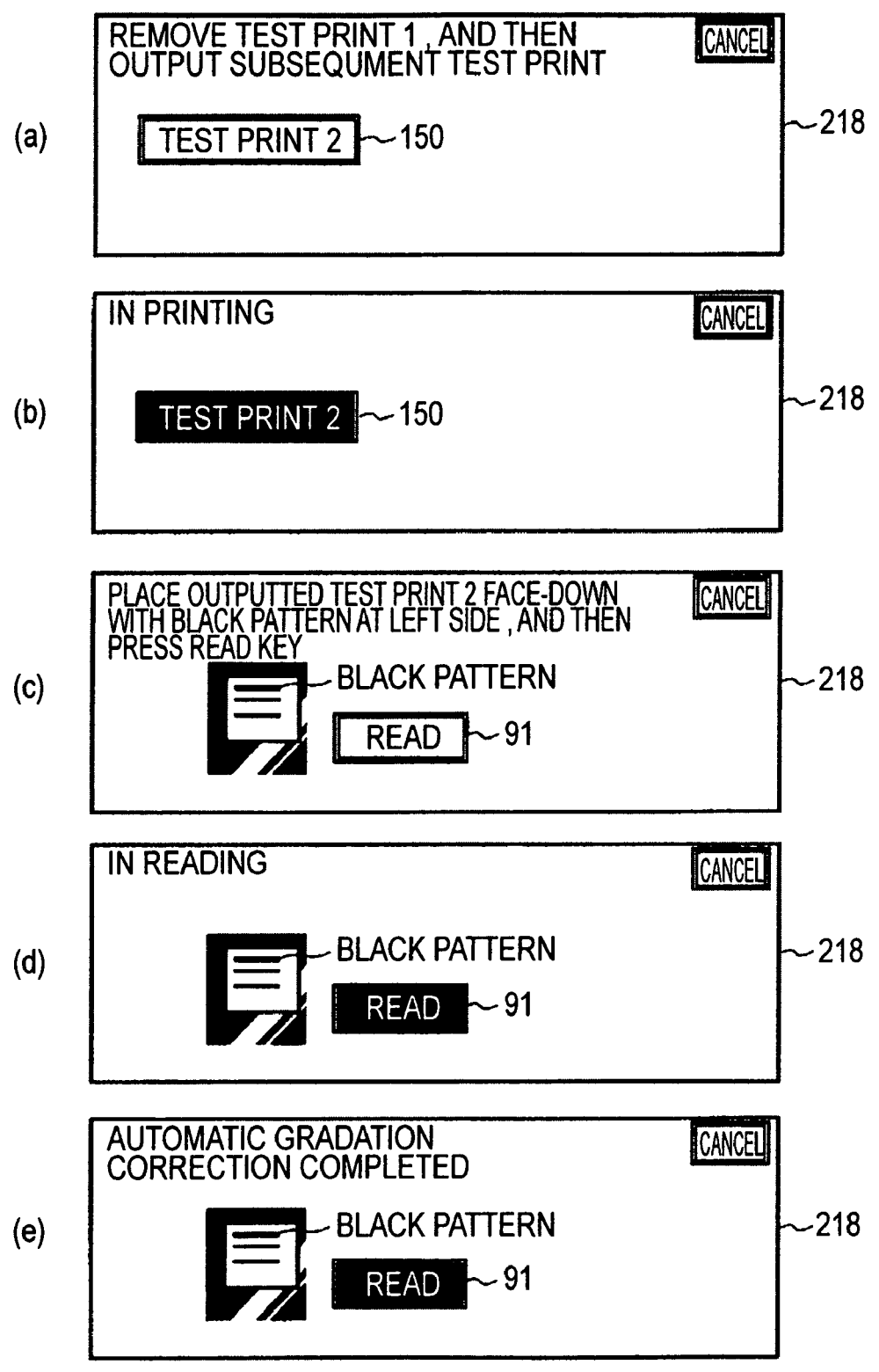

When an operator, e.g., presses a mode setting button of "automatic gradation correction" provided at an operating portion 217 (FIG. 2(a)), the calibration shown in FIG. 7 is started. A display device 218 is constituted by a liquid crystal operation panel provided with a touch sensor (a touch display panel) as shown in FIGS. 8 to 10.

Figure 11:
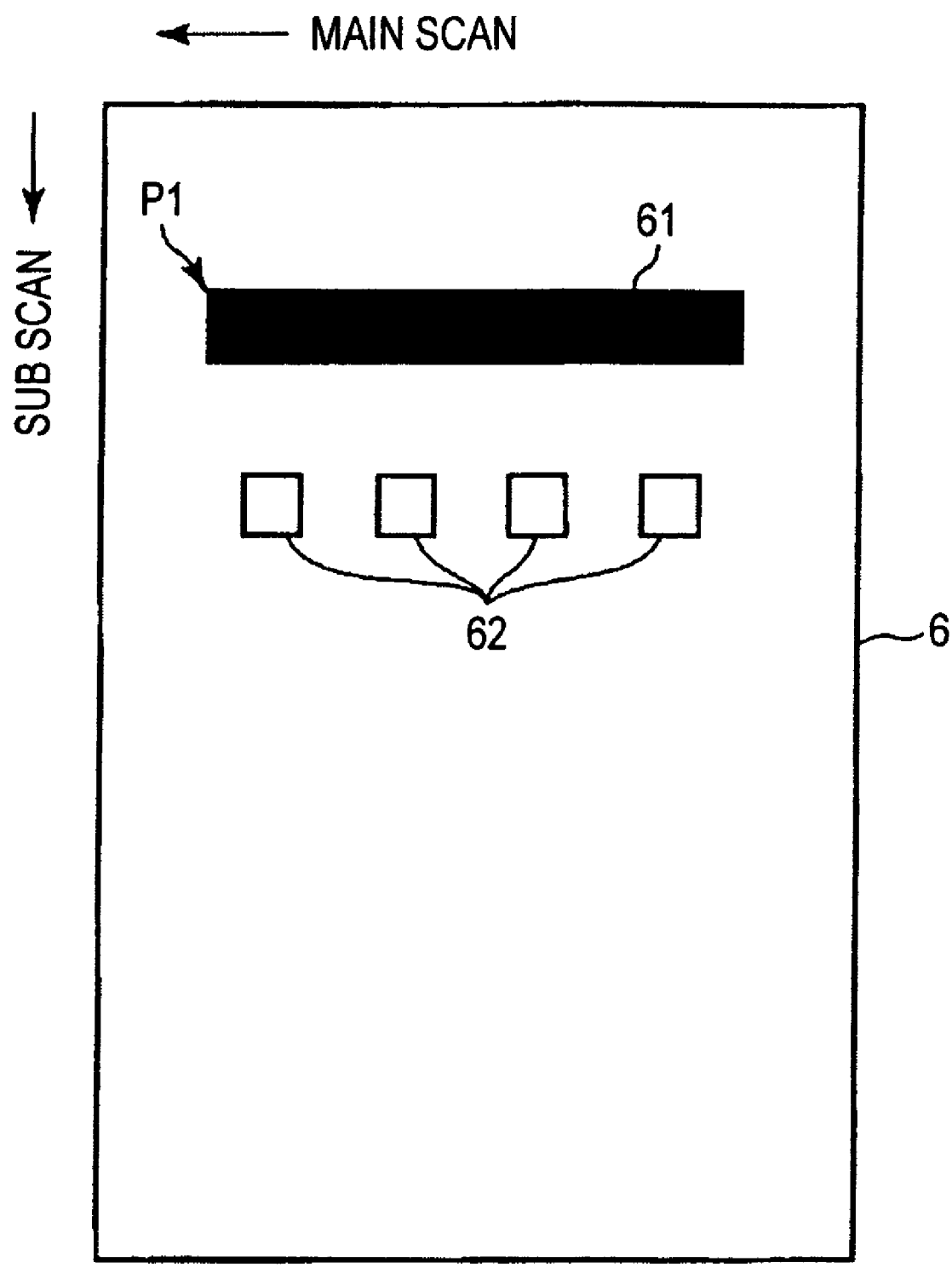
FIGS. 11 and 12 show embodiments of a test print 1 and a test print 2, respectively.

First, a "test print 1" button 81, which is a start button for the test print 1 shown in FIG. 8(a) is displayed. When the operator presses the "test print 1" button, a test print 1 shown in FIG. 11 is printed out (S1 of FIG. 7). Display during printing is as shown in FIG. 8(b). At that time, the CPU 214 judges whether or not there is a recording material 6 on which the test print 1 is formed. When there is no recording material 6, a caution message as shown in FIG. 8(b) is displayed at the display portion 218.

As a contrast potential at the time of forming the test print 1, a contrast potential in a standard state developing on an environment used is registered as an initial value and is used. Further, the image forming apparatus is provided with a plurality of recording material cassettes for accommodating individually recording materials 6 having sizes of B4, A3, A4, B5, etc., and is designed to select therefrom a desired-sized recording material 6. In this embodiment, however, the recording material 6 used for this control is set to be a so-called large-sized paper, i.e., those having a size of B4, A3, 11×17, and LGR, in order to obviate such an error that an arrangement of the recording material 6 is erroneously recognized din a later reading operation as to be portrait (vertical) or landscape (horizontal) orientation.

Figure 12:
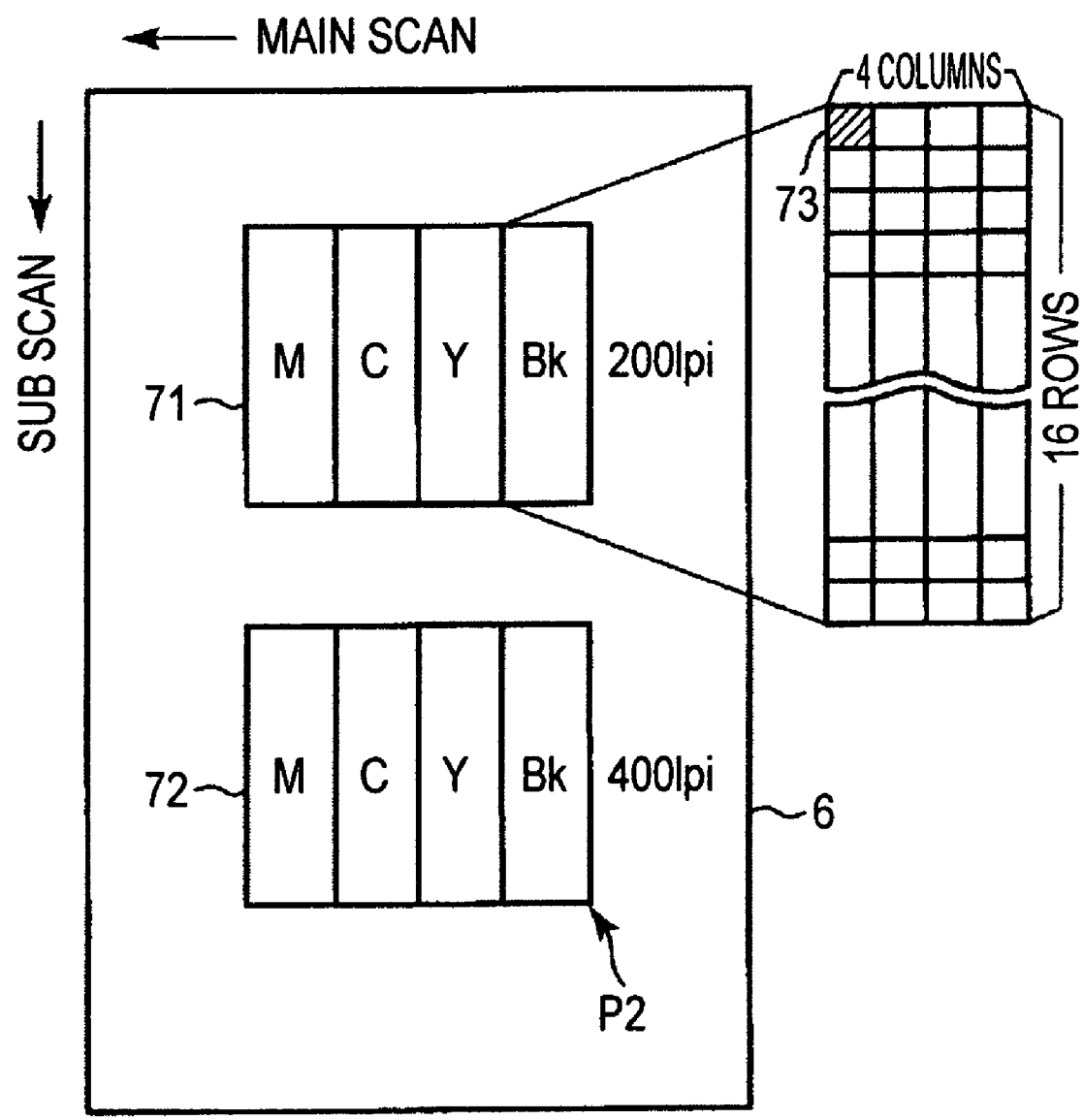

The test print 1 shown in FIG. 11 includes a belt-like pattern 61 at an intermediary gradation density for four colors of Y, M, C and Bk. By checking this pattern 61 with eyes, it is confirmed that there are no streak-like abnormal image, density irregularity, and color irregularity. Sizes of a patch pattern 62 shown in FIG. 11 and gradation patterns shown in FIG. 12 are set so that they are in a reading range of the CCD sensor 105 in the thrust direction.

In the case where the abnormal image is recognized by the visual check, the test print 1 is printed again, and when the abnormal image is still recognized, it is necessary to call a service person for performing maintenance. Incidentally, it is also possible to automatically judge whether or not the belt-like pattern 61 is read by the reader unit A and on the basis of density information thereof in the thrust direction, a subsequent control should be performed.

On the other hand, the patch pattern 62 is a maximum density patch for respective colors of Y, M, C and Bk, i.e., a patch pattern corresponding to a density signal value of 255.

Figure 13:
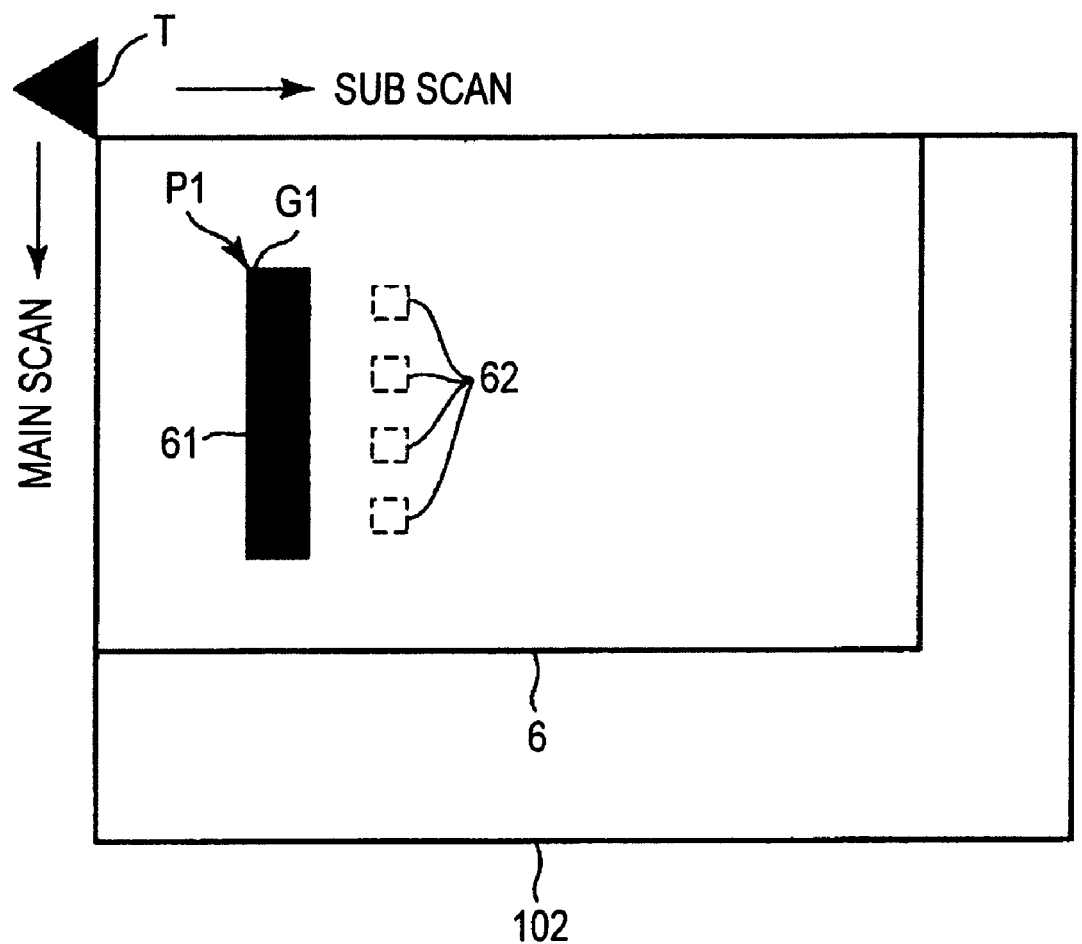
FIGS. 13 and 14 are views each showing a state that the test print 1 (FIG. 13) or the test print 2 (FIG. 14) is placed on an original support glass plate.

Then, the operator places the test print 1 on the original supporting glass plate 102 as shown in FIG. 13, and presses a "reading" button 91 as shown in FIG. 9(a). At that time, as shown in FIG. 9(a), an operation guidance for the operator is displayed on the display device 218.

FIG. 13 is a top view, i.e., a view showing a state that the original supporting glass plate 102 is viewed from above. A black triangular symbol T shown at an upper-left corner of the glass plate 102 is a mark for original abutment. A massage for guidance is displayed on the display device for guidance is displayed on the display device 218 so that a corner P1 of the belt-like pattern 61 is located close to the abutment mark T and the operator does not mistake the right/back side of the test print 1. Accordingly, the operation guidance is displayed for the purpose of preventing erroneous control due to arrangement error of the test print 1.

In the case where the patch pattern 62 is read, a first density gap point G1 is obtained at the corner P1 of the belt-like pattern 61 when scanning is performed gradually from the abutment mark T. From coordinates of the density gap point G1, relative positions of respective patches of the patch pattern 62 are calculated and the density of the patch pattern is read (S2 of FIG. 7). During the reading of the test print 1, such density as shown in FIG. 9(b) is effected, and when the orientation or the position of the test print 1 is not correct and it is impossible to perform reading, such density as shown in FIG. 9(c) is displayed and the operator is caused to correct the arrangement of the test print 1 and press the "reading" button 91, thus permitting again the reading of the test print 1.

In order to convert RGB values obtained from the patch pattern 62 into optical densities, the following equations (2) are used. In order to provide the same values as those obtained by an commercially available densitometer, a correction coefficient k is used for adjustment. Further, it is also possible to prepare an LUT separately to convert luminance information on RGB into density information on MCYBk.

$M = -km \times \log_{10}(G/255)$ $C = -kc \times \log_{10}(R/255)$ $Y = -ky \times \log_{10}(B/255)$ $Bk = -kk \times \log_{10}(G/255)$ (2)

Next, a method of correcting a maximum density from the resultant density information will be described.

Figure 15:
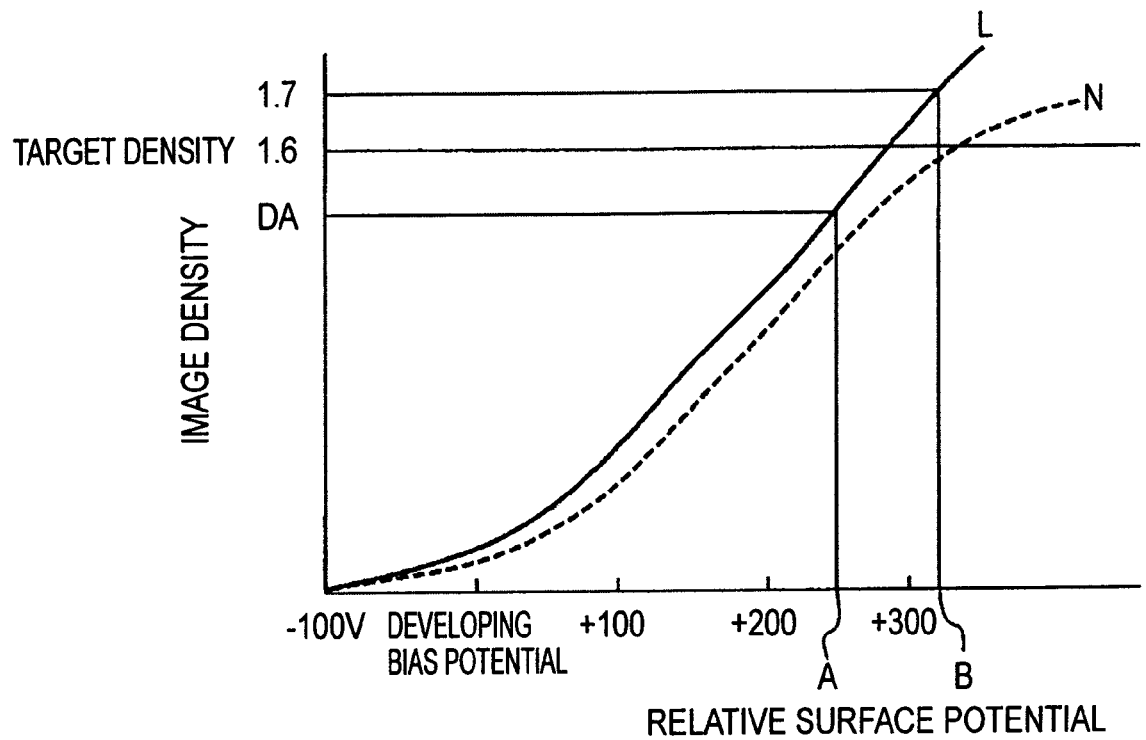
FIG. 15 is a graph showing a relationship between a relative drum surface potential of a photosensitive drum and an image density.

FIG. 15 is a graph showing a relationship between a relative drum surface potential of the photosensitive drum 4 and an image density obtained through the above described operation.

In FIG. 15, A represents a contrast potential at the time of printing the test print 1 (i.e., a difference between the developing bias potential and a surface potential of the photosensitive drum 4 which has been exposed to light with laser light modulated with a maximum signal value (255 for 8 bits) after the photosensitive drum 4 is primary-charged, and DA represents a density obtained from the patch pattern 5 at the contrast potential A.

In the maximum density area, the image density with respect to the relative drum surface potential corresponds linearly thereto in almost all cases as indicated by a solid line shown in FIG. 15. However, in a two component developing system, when a toner concentration in the developers 3 is charged and lowered, as indicated by a broken line N shown in FIG. 15, the image density with respect to the relative drum surface potential in the maximum density area becomes non-linear in some cases. Accordingly, in the embodiment shown in FIG. 15, a final target (desired) value is set to 1.6 but a control target value is set to 1.7 including a margin of 0.1, thus determining amounts for control. In this case, a contrast potential B is obtained according to the following equation (3):

$$B = (A + Ka) \times 1.7 / DA \quad (3)$$

wherein Ka represents a correction coefficient and its value may preferably be optimized depending on the kind of developing methods.

Figure 16:
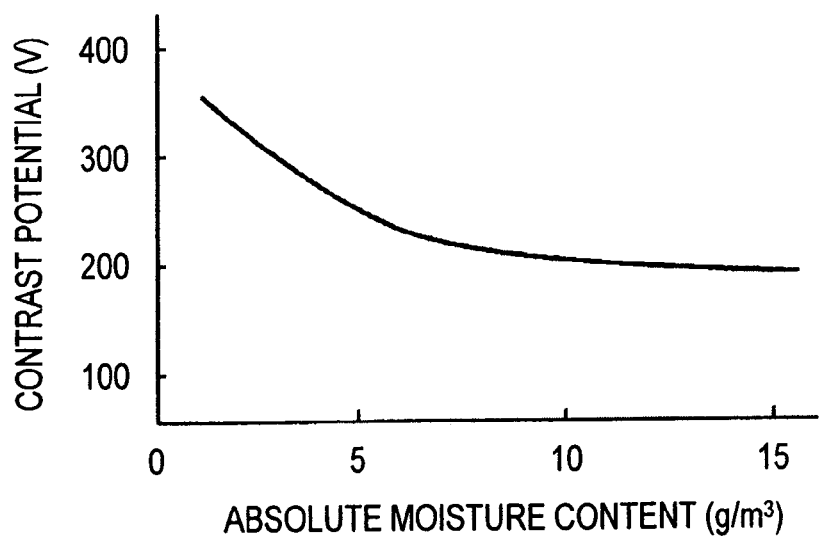
FIG. 16 is a graph showing a relationship between an absolute moisture content and a contrast potential.

The contrast potential in electrophotography fails to provide the same image density for the original image and the output image unless it is set depending on environment, so that the contrast potential corresponding to the maximum density is set, as shown in FIG. 16, on the basis of an output of an environmental sensor for monitoring a moisture content in the image forming apparatus as described above (i.e., an absolute moisture content).

Accordingly, in order to correct the contrast potential, a correction coefficient Vcont.rate 1 obtained from the equation (4) shown below is stored in, e.g., a backup RAM.

$$\text{Vcont.rate 1} = B/A \quad (4)$$

In the image forming apparatus, the environmental moisture content is monitored, e.g., every 30 minutes by the environmental sensor. On the basis of the detection result of the moisture content, A×Vcont.rate 1 is calculated after determinating a value of A, thus obtaining the contrast potential.

Figure 17:
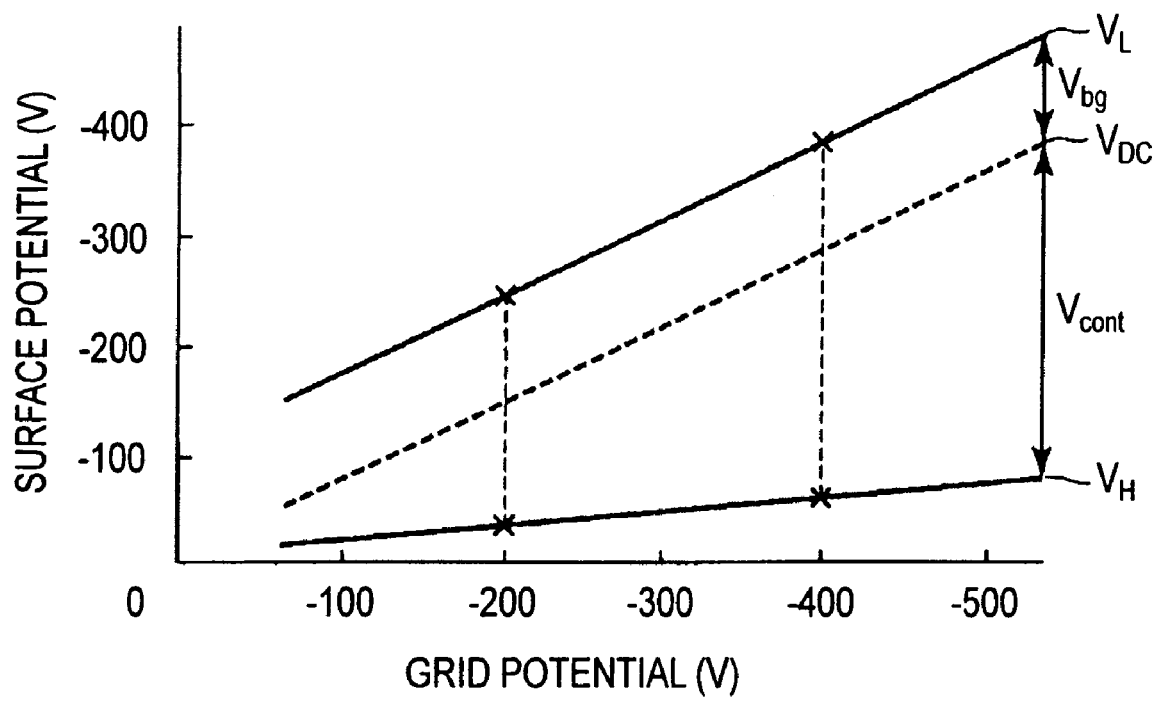
FIG. 17 is a graph showing a relationship between a grid potential and a surface potential.
Figure 18:
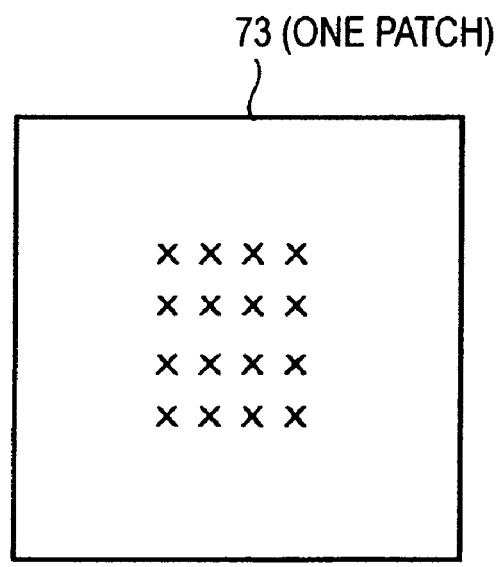
FIG. 18 is a view for illustrating density reading points of a patch.

Next, a method of obtaining a grid potential and a developing bias potential from the resultant contrast potential will be briefly described. FIG. 17 is a graph showing a relationship between the rid potential and the surface potential of the photosensitive drum 4.

The grid potential is set to −200 V, and a surface potential $V_L$ of the photosensitive drum 4 exposed to laser light modulated with a minimum signal value and a surface potential $V_H$ of the photosensitive drum 4 exposed to laser light modulated with a maximum signal value are measured by a surface potential sensor 12. Similarly, $V_L$ and $V_H$ are measured when the grid potential is set to −400 V. Then, data for −200 V and −400 V are subjected to interpolation and extrapolation to obtain a relationship between the grid potential and the surface potential. This control for obtaining the potential data is referred herein to as "potential measurement control".

Next, a developing bias (voltage) $V_{DC}$ is set with a difference Vbg (e.g., 100 V), from $V_L$, which has been set as not to cause toner fog on an image. A contrast potential Vcont is a differential potential between the developing bias $V_{DC}$ and the surface potential $V_H$ and as described above, a larger Vcont provides a larger maximum density.

The grid potential and the developing bias for obtaining the calculated contrast potential B can be determined from the relationship shown in FIG. 17. Accordingly, the CPU 28 calculates the contrast potential so that the maximum density is higher than the final target value by 0.1, and determines the grid potential and the developing bias potential so as to provide the contrast potential (S3 of FIG. 7).

Next, the determined contrast potential is judged whether it is within the control range or not (S4 of FIG. 7). When the contrast potential is out of the control range, it is judged that there is abnormality of the developing device(s) 3 etc., and an error flag is set so that the developing device corresponding to an associated color is checked. A state of this error flag can be confirmed by the service person in a predetermined service mode. Further, at the time of abnormality, the contrast potential is corrected when it is the limit of the control range and the control is continued (S5 of FIG. 7).

So as to provide the contrast potential set as described above, the CPU 28 controls the grid potential and the developing bias (S6 of FIG. 7).

Figure 28:
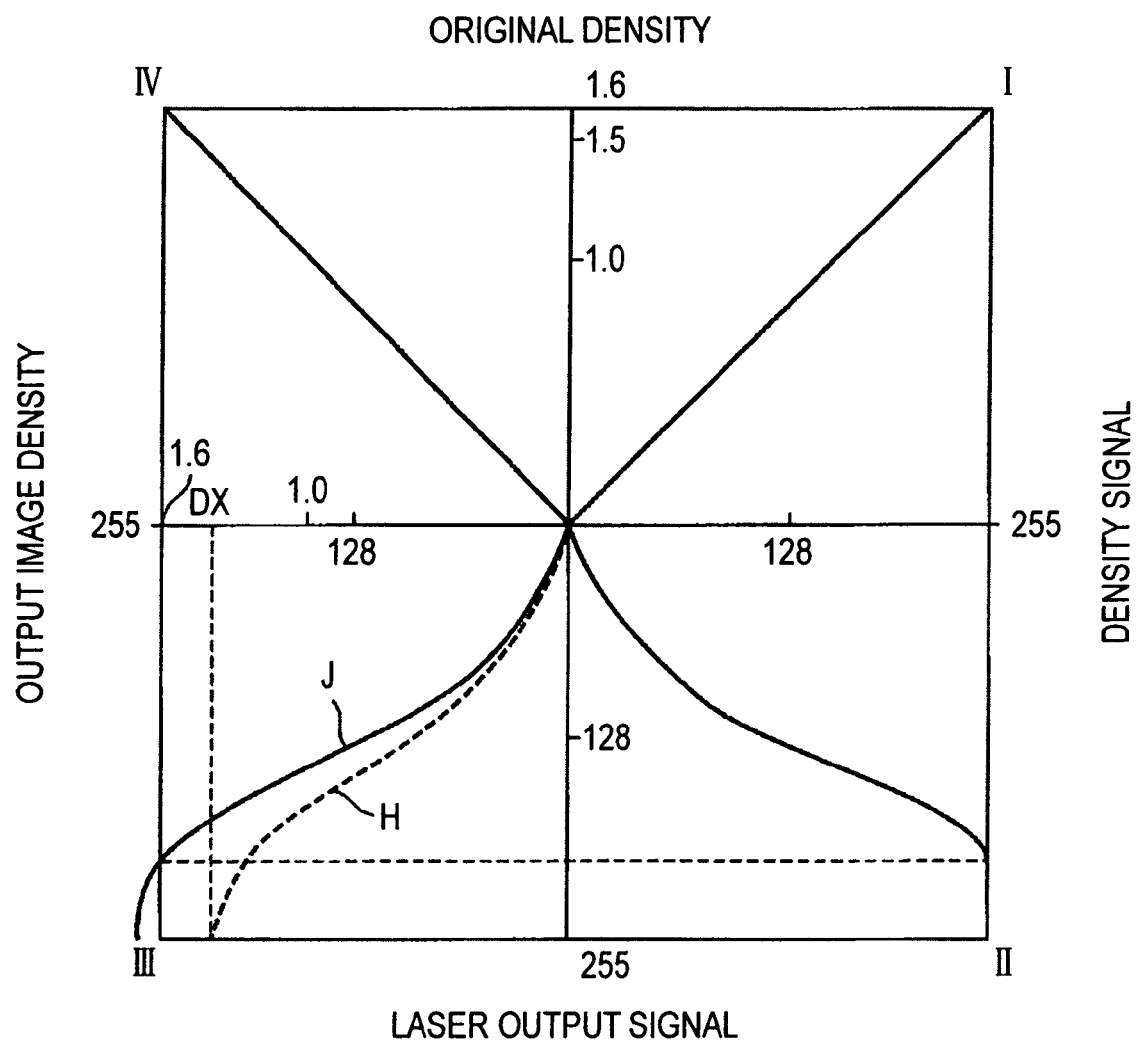
FIG. 28 is a view showing a density conversion characteristic after control.

FIG. 28 is a chart showing a density conversion characteristic after control. In this embodiment, by controlling the maximum density so as to be higher than the final target value, a printer characteristic in the third quadrant (III) is represented by a solid line L. In the case where such control is not effected, there is a possibility that the printer characteristic becomes such a printer characteristic represented by a broken line H that the maximum density does not reach 1.6. In the case of the printer characteristic indicated by the broken line H, the maximum density cannot be increased by the LUT 25, so that it is impossible to reproduce a density area between the density $D_H$ and the density of 1.6 even when the LUT 25 is set in any manner. As shown by the solid line J, when the printer characteristic is such that it slightly exceeds the maximum density, a density reproduction area is ensured by the correction with the LUT 25 as shown by the total gradation characteristic in the fourth quadrant (IV).

Then, as shown in FIG. 10(*a*), a "test print 2" button 150 as a start button of test print 2 is display don the display device 218. When the operator presses the "test print 2" button 150, the test print 2 shown in FIG. 12 is printed out (S7 of FIG. 7). Display during the printing is as shown in FIG. 10(*b*).

The test print 2 is constituted by a gradation patch group of 4×16 (64 gradation levels) patches for each of the colors Y, M, C and Bk, as shown in FIG. 12. This 64 gradation levels are predominantly allocated in a low density area of all the 256 gradation levels and are thin out in a high density area. This allocation is made so as to effectively adjust a gradation characteristic particularly at a highlight portion.

In FIG. 12, a patch pattern 71 is a patch group having a resolution of 200 lpi (line/inch), and a patch pattern 72 is a patch group having a resolution of 400 lpi. Image formation at respective resolutions can be realized by preparing a plurality of signals of, e.g., a triangular wave which is used for comparison with image signals to be processed in the pulse width modulation circuit 26*a* (FIG. 5).

In this embodiment, the image forming apparatus forms a gradation image such as a photographic image at 200 lpi and a character or a line image at 400 lpi, on the basis of the output signal from the above described black character judgement portion. The pattern at the same gradation level may be outputted at these two types of resolutions. However, in the case where a difference in resolution largely affects the gradation characteristic, a pattern at a gradation level corresponding to the resolution required may preferably be outputted.

The test print 2 is printed on the basis of an image signal generated from a pattern generator 29 without using the LUT 25.

Figure 14:
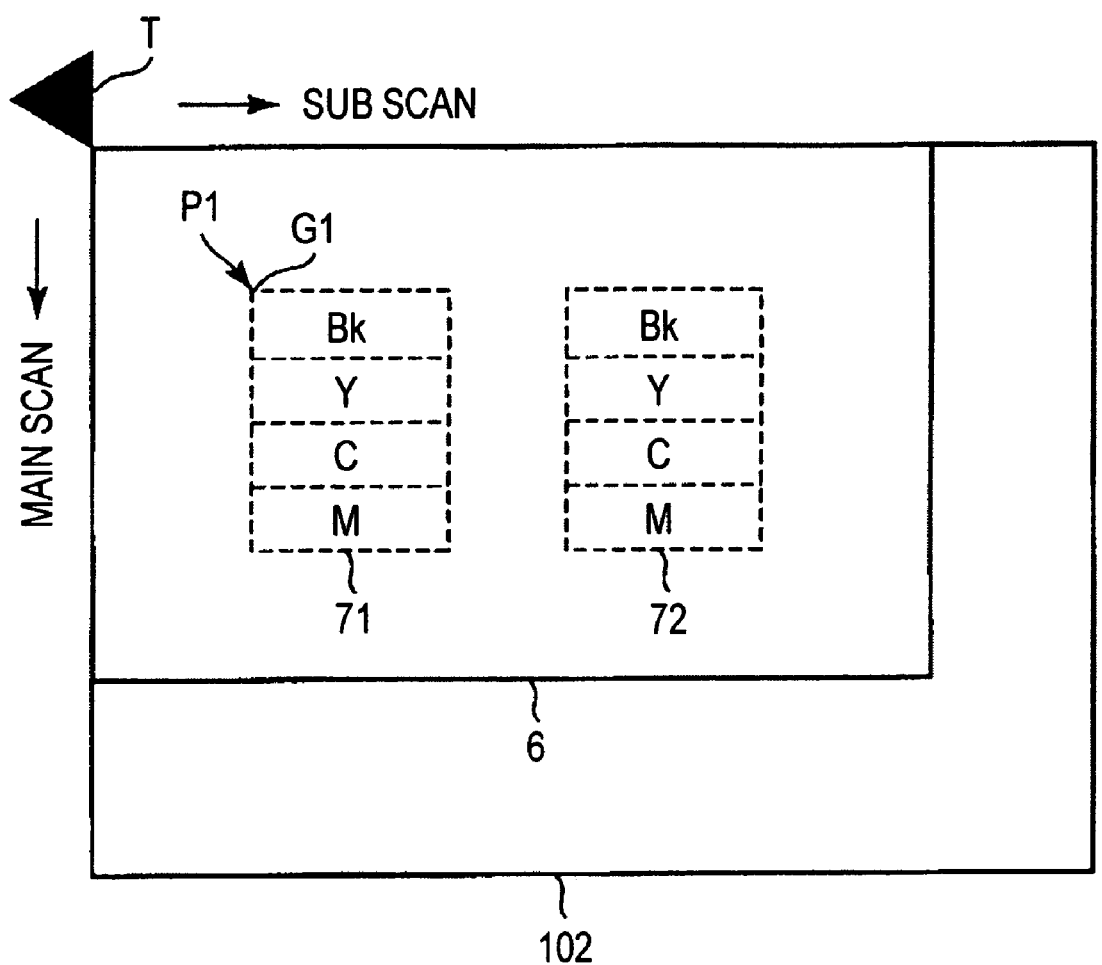

FIG. 14 is a view of the original supporting glass plate 102, on which the test print 2 is placed, which is viewed from above. A message is displayed on the display device 218 so that a patch pattern Bk is located close to the abutment mark T and the right side of the recording material 6 is not erroneously arranged (FIG. 10(c)), whereby a control error due to an arrangement error of the test print 2.

WHen the patch patterns 71 and 72 are read, gradual scanning thereof is performed from the abutment mark T to provide a first density gap point G2 at a corner P2 of the patch pattern 72 (FIGS. 12 and 14). From coordinates of the density gap point G2, relative positions of the respective patches of the patch patterns 71 and 72 are calculated to read the densities of the patch patterns 71 and 72 (S8 of FIG. 7). During the reading of the test print 2, density as shown in FIG. 10(d) is performed.

A read value of one patch (e.g., the patch 73 shown in FIG. 12 is obtained, as shown in FIG. 8, by providing 16 points in the patch 73 and calculating an average of values obtained by reading the 16 points. The number of reading points may preferably be optimized by the reading apparatus and the image forming apparatus.

Figure 19:
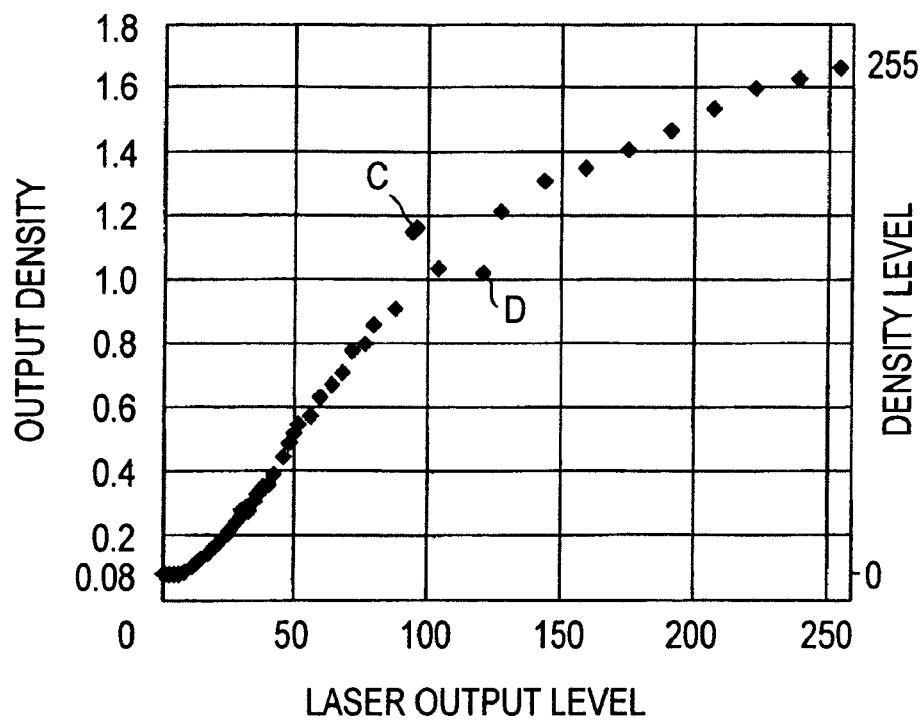
FIG. 19 is a graph showing a relationship between a density read from the test print 2 and a laser output level.

FIG. 19 is a graph showing a relationship between a laser output level (a value of image signal) and an output density obtained by converting RGB signals obtained from the respective patches into density values through the above described conversion method into the optical density. As shown by the right-hand ordinate in FIG. 19, the target value of 1.60 of the maximum density is normalized to 2551 levels by taking the background density (e.g., 0.08) of the recording material 6 as a level of 0.

In the case where the read patch density is specifically high as indicated by a point C in FIG. 19 or specifically low as indicated by a point D in FIG. 19, staining on the original supporting glass plate 102 or failure of test print can be considered. In such a case, a slope of data string is corrected by use of a limiter in order to maintain a continuity of the data string. For example, when the slope of the data string exceeds 3, the slope is fixed to 3. On the other hand, when the slope value of the data string is negative, the patch density is set to be identical to that for a lower density patch by one level.

In the LUT 25, a conversion characteristic opposite from the characteristic shown in FIG. 19 may be set (S9 of FIG. 7). More specifically, the density level (the ordinate of FIG. 19) is used as the input level (density signal in FIG. 6) and the laser output level (the abscissa of FIG. 19) is used as the output level (laser output signal in FIG. 6). With respect to a level which does not correspond to the patch, a value of the level is obtained by an interpolation operation. At that time, when a condition that an input level of 0 corresponds to an output level of 0 is provided.

As described above, control of the contrast potential and preparation of the γLUT correction table by the first control system are completed and such density as shown in FIG. 10(e) is performed.

(Supplementary Control of Gradation Characteristic)

Next, correction of the gradation characteristic after the control thereof by the first control system described above will be described.

The image forming apparatus in this embodiment effects the correction of maximum density with respect to the environmental change by the above described contrast potential control but further effects an additional correction of the gradation characteristic (referred to as "supplementary control of gradation characteristic").

Figure 20:
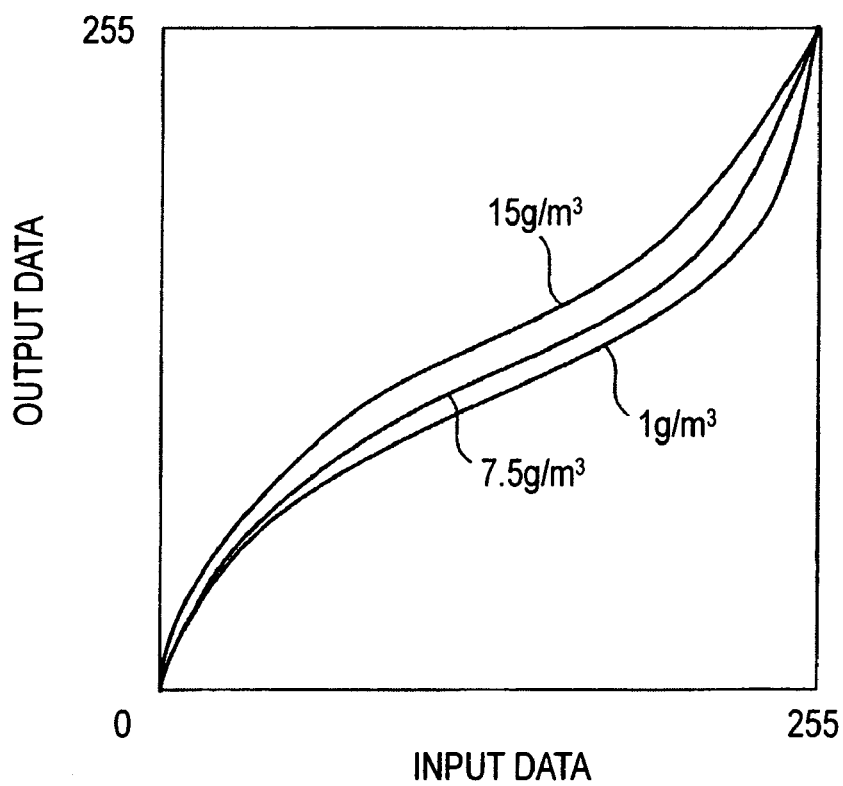
FIG. 20 is a graph for illustrating a look-up table (LUT) varying depending on a moisture content.

In view of such a case where the environment is changed in a state that the first control system is deactivated, table data of the LUT 25 depending on the environments (e.g., moisture contents of 1 g/m$^3$, 7.5 g/m$^3$ and 15 g/m$^3$) are stored in an ROM 30 as shown in FIG. 20.

Then, control by the first control system is performed and the resultant table data LUT 1 and the LUT 25 and corresponding amounts of the moisture contents are stored in a battery backup area of the ROM 30 or the like. Table data stored in the ROM 30, corresponding to the water content amounts are referred to as "LUTA".

Thereafter, every change in environment, table data LUT B of the ROM 30 corresponding to the moisture content amounts at that time are obtained as by use of the LUTA and the LUTB, the LUT1 is corrected. In other words, an appropriate table data LUT present can be obtained according to an equation (5) shown below, without performing the control by the first control system, by adding a difference between the LUTB and the LUTA corresponding to the moisture content amounts into the LUT1.

$$LUT\text{present} = LUT1 + (LUTB - LUTA) \quad (5)$$

By such a supplementary control, the input/output characteristic of the image forming apparatus can be corrected linearly. As a result, an irregularity in density gradation characteristic for each image forming apparatus can be suppressed, so that it becomes possible to readily set a standard state.

Such a supplementary control is opened to users of image forming apparatuses, whereby at the time when the gradation characteristic of the image forming apparatus is judged to be poor, it is possible to effect the gradation control as needed and readily correct the gradation characteristic of the system including both of the reader and printer units.

Further, it is also possible to appropriately effect even the above described correction with respect to the environmental change.

The service person can switch an enable/disable mode of the first control system, so that at the time of maintenance of the image forming apparatus, the service person can readily judge the state at the first control system in a short time by disabling the first control system. Incidentally, in the case of disabling the first control system, a standard contrast potential of the model of the image forming apparatus and table data of the LUT 25 are read from the ROM 30 and set in the CPU 28 or the LUT 25. Accordingly, at the time of maintenance, a deviation of the characteristic from the standard state becomes clear, so that optimum maintenance can be performed efficiently.

(Second Control System)

Next, a second control system, with respect to stabilization of an image reproduction characteristic of the printer unit B alone, as image control performed during ordinary image formation will be described.

The second control system stabilizes the image reproducibility by detecting a density of a patch formed on the photosensitive drum 4 and correcting the LUT 25.

Figure 21:
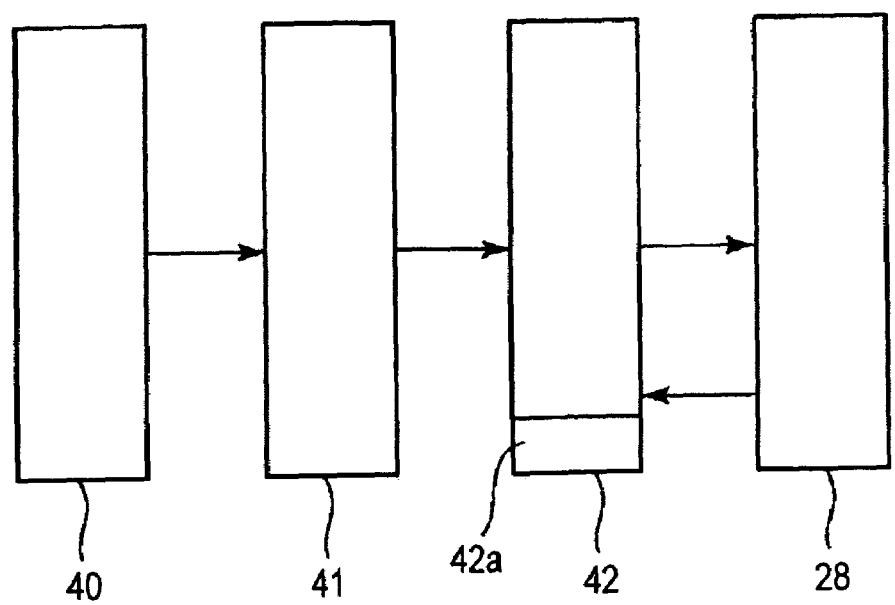
FIG. 21 is a block diagram showing a circuit structural embodiment for processing an output signal of a photosensor.

FIG. 21 is a block diagram showing a structural embodiment of a circuit for processing the output signal from the above described photosensor 40. Reflected light (near-infrared light), from the photosensitive drum 4, inputted into the photosensor 40 is converted into an electric signal of 0–5 V. The electric signal is converted into an 8-bit digital signal by an A/D conversion circuit 41 and then is converted into density conversion circuit 42.

Incidentally, the toners used in this embodiment are color tones of yellow (Y), magenta (M), and cyan (C), each prepared by dispersing a coloring material for each color into a binder comprising a styrene-based copolymer resin. The photosensitive drum 4 is an OPC drum having a reflectance, with respect to near-infrared light (960 nm), of about 40%, but in the case of the same reflectance, it is also possible to employ an amorphous silicon type photosensitive drum. The photosensor 40 is designed to detect only regular reflected light.

Figure 22:
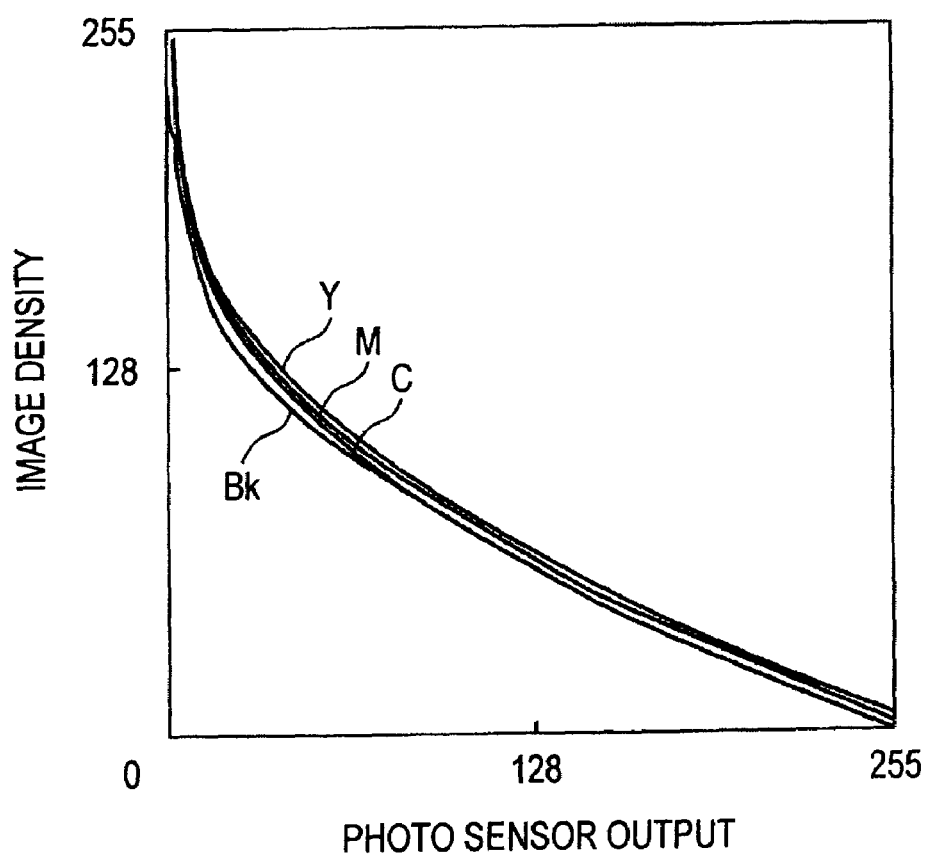
FIG. 22 is a graph showing a relationship between a photosensor output and an output image density when a density of patch is changed stepwise.

FIG. 22 is a graph showing a relationship between an output of the photosensor 40 and a density of an output image when the density of the patch formed on the photosensitive drum 4 is changed stepwise depending on areal gradation levels of the respective colors. In FIG. 22, the output of the photosensor 40 placed in such a state that the toner is to deposited on the photosensitive drum 4 is set to 5 V, i.e., 255 levels. As shown in FIG. 22, as the image densities are increased with increasing area coverages by the respective toners, the outputs from the photosensor 40 become small.

Based on these characteristics, by preparing the table 42a (FIG. 21) only for each of the colors, for converting the sensor output into the densities signal, it becomes possible to read the density with good accuracy for the respective colors.

Figure 23:
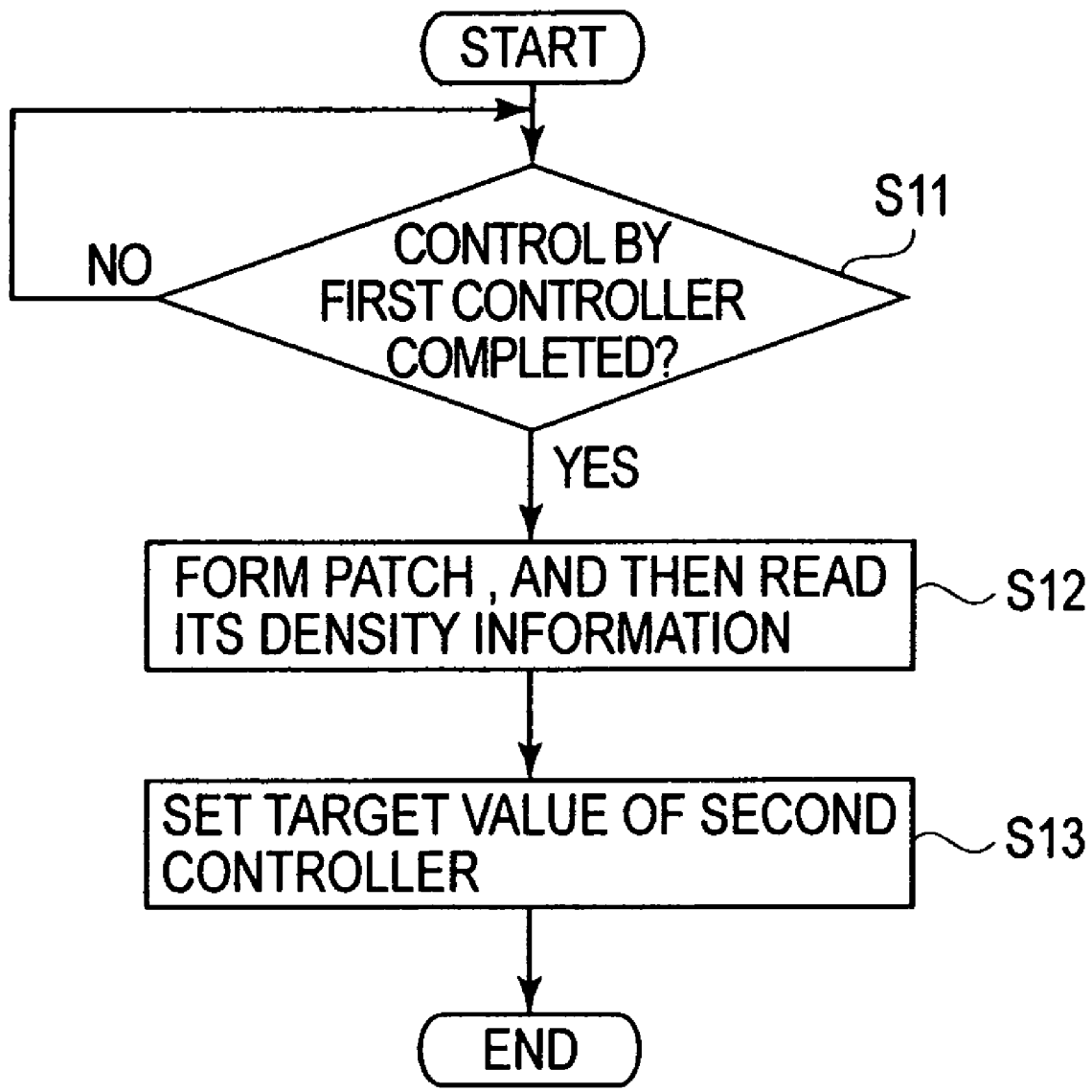
FIG. 23 is a flow chart showing an embodiment of a target (desired) value setting processing.

The second control system is used for maintaining the stability of color reproducibility attained by the first control system, so that a state immediately after completion of control by the first control system is set as a target value. FIG. 23 is a flow chart showing an embodiment of target value setting processing.

Referring to FIG. 23, when the control by the first control system is completed (S11), respective patches for Y, M, C and Bk are formed on the photosensitive drum 4 and reflected light therefrom is read by the photosensor 40 to be converted into density information (S12). Then, a target value of the second control system is set (S13).

As the laser output at the time of forming the patches, density signals of 128 levels are used for the respective colors. In that case, the Table data and the contrast potential identical to those used for the first control system are used.

Figure 24:
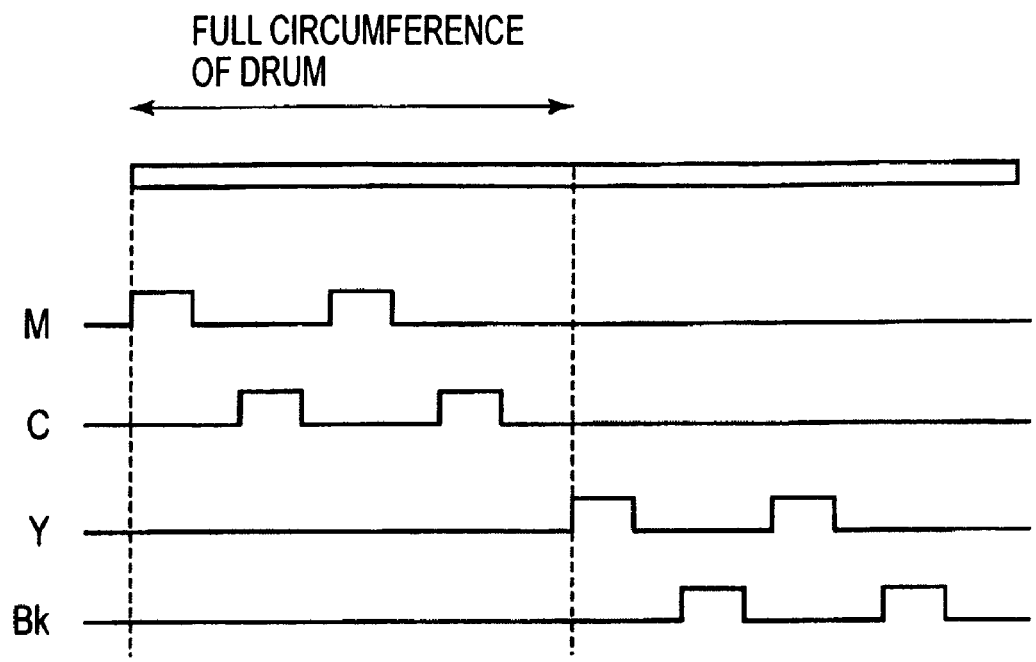
FIG. 24 is a view showing a sequence for forming a patch on a photosensitive drum.

FIG. 24 is a view showing a sequence for forming the patches on the photosensitive drum 4.

In this embodiment, a photosensitive drum 4 having a relatively large diameter is used. Further, in order to accurately and efficiently obtain the density information in a short time, the same color patches are formed so as to be symmetric with respect to the centre (point) of the photosensitive drum 4 in view of eccentricity of the photosensitive drum 4, and then the patches are subjected to measurement to obtain a plurality of values, thus providing an average of the resultant measured values to obtain density information. Further, the patches for two colors are formed per full circumference of the photosensitive drum 4,and as shown in FIG. 24. the photosensitive drum 4 is rotated by two circumferences thereof to obtain density information on the four colors. Thereafter, density information corresponding to an image density of 128 is stored in the RAM 32 or the like as a target value of the second control system. This target value is updated whenever the control by the first control system is performed.

Figure 25:
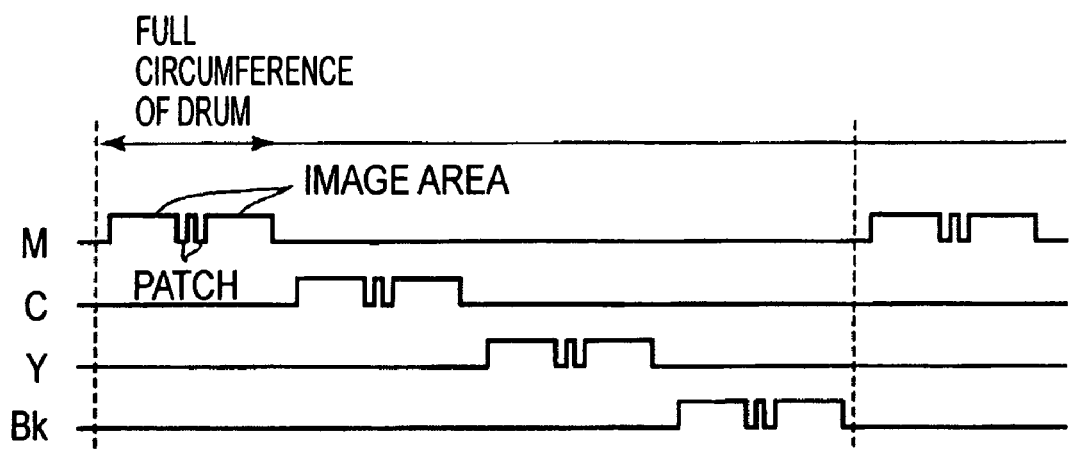
FIG. 25 is a view showing a sequence for forming a patch on a photosensitive drum in a non-image area during ordinary image formation.

The second control system forms patches in a non-image area during ordinary image formation and detects densities thereof to correct the table data of the LUT 25 obtained by the first control system whenever necessary. Such an area on the photosensitive drum 4 as to correspond to a gap portion of the recording material wound around the transfer drum 5 is the non-image area, FIG. 25 is a view showing a sequence for forming the patches in the non-image area on the photosensitive drum 4 during the ordinary image formation. In this case, an A4-sized full color image is continuously outputted.

It is important that the laser output for forming the patches is equal to or larger than that at the time of setting the target value. For this reason, a 128-level density signal is used for each color. At that time, the table data of the LUT 25 and the contrast potential are set to be equal to those during the ordinary image formation. More specifically, as the γLUT correction table, a result obtained by correcting the table data of the LUT 25 obtained through the first control system by control of the second control system to the last time is used.

The 128-level density signal is corrected so that the patch density becomes 128 by use of the LUT 25 having a density scale normalized so as to take the density of 1.6 as 255. However, the image characteristic of the printer unit B is unstable, so that there is a possibility that it is always changed. For this reason, the density as the measurement result does not always becomes 128. Based on a deviation ΔD between the density signal and the measurement result, the second control system corrects the table data of the LUT 25 prepared by the first control system.

Figure 26:
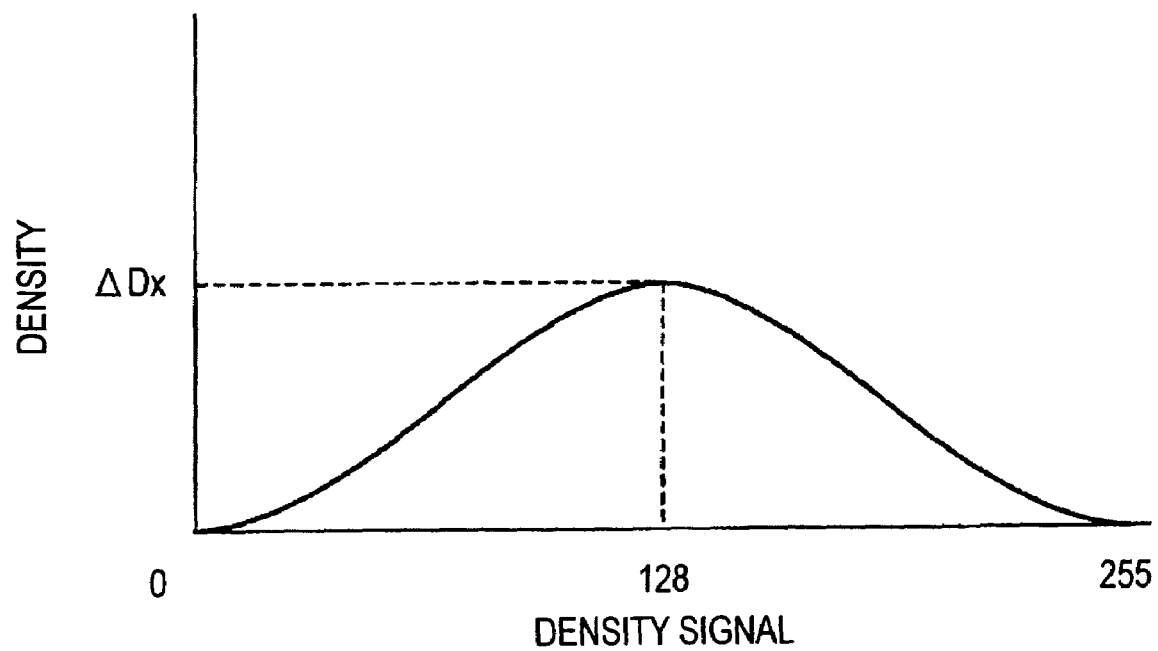
FIG. 26 is a view showing a γLUT correction table.

FIG. 26 is a graph showing a γLUT correction table of an ordinary density signal in the case where a deviation of the patch density from the 128-level density signal is ΔDx. Such a γLUT correction table is stored in the ROM 30 in advance, and the γLUT correction table is normalized so that ΔDx is ΔD during control by the second control system. Further, table data for cancelling the normalized ΔLUT correction table are added to those of the LUT 25, thus correcting the LUT 25.

Rewriting (correcting) timing of the LUT 25 is different for each color, so that the rewriting is performed on the basis of a TOP signal in such a period that a laser light scanning (exposure to laser light) for an associated color is not performed in a rewriting-ready stage.

Δ is a deviation value between a target value obtained from the patch formed in the previous (preceding) control by use of the LUT 25 and a density obtained from the patch formed in current control by use of the LUT 25. However, the patch is formed every time by use of the LUT 25 corrected by the previous control by the second control system, so that a deviation value Δn between a read patch density and the target value is different from ΔD. For this reason, an integral of ΔDn is stored as ΔD.

The present invention is characterised in that image formation is ordinarily performed by use of a γLUT correction table prepared by immediately before correction (the latest correction) but in the present invention, not the γLUT correction table prepared by the immediately before correction, a γLUT correction table prepared by a first correction of a plurality of correction (controls) performed from the previous power-on to the previous power-off. At the time of power-on, the image forming apparatus is in such a state that it is leftstanding for some time in many cases, so that the image characteristic in the state is largely different from that at the time when the γLUT correction table is prepared by the immediately before correction in many cases, but is rather close to that at the time of the previous power-on. This is because a reproducibility of the influence of the standing of the image forming apparatus on the developer and the photosensitive drum is high. This tendency is noticeable in such an installation environment that the image forming apparatus is always used in a regular manner.

Accordingly, in the present invention, at the start after the previous power-on, i.e., after the previous power-on, in a period from completion of first image formation to before start of second image formation, a sequence of steps of "patch formation", "patch density detection", and "γLUT correction table preparation". The γLUT correction table is stored in a nonvolatile memory (ROM) as a storing means in advance and is used in first image formation after a subsequent power-on. As a result, it is possible to omit the above described sequence of the steps during the period from the power-on to the first image formation, so that it is possible to stabilize a density or coloring of an image from first image formation after power-on while shortening a time from power-on to completion of first image formation, i.e., a first copy time (FCOT), as much as possible.

Figure 27:
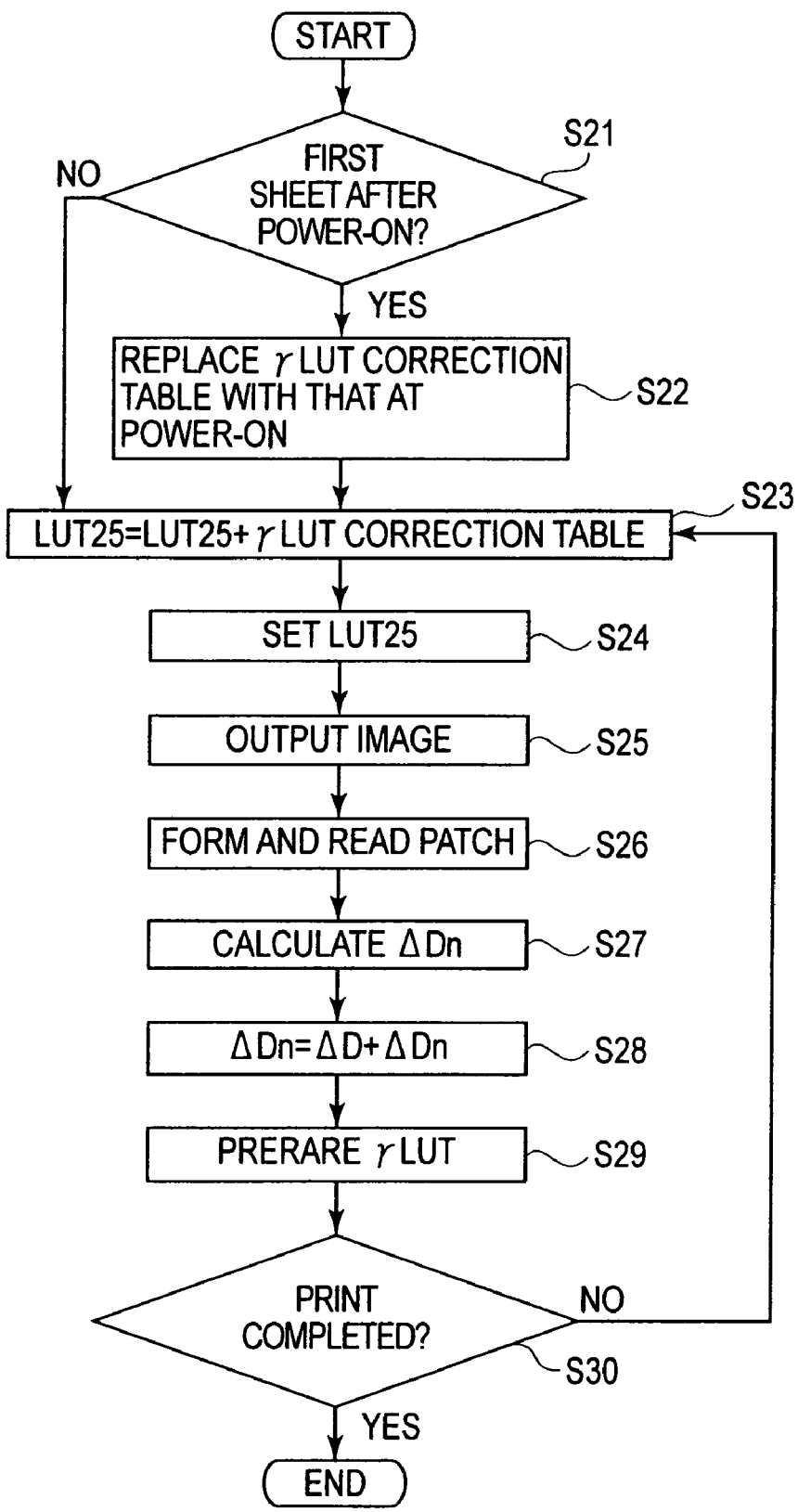

FIG. 27 is a flow chart showing a processing for preparing the γLUT correction table, and the processing is started together with the start of ordinary image formation.

Referring to FIG. 27, first, image formation is judged whether it is first image formation after power-on or not (S21). In the case where the image formation is the first image formation after power-on, a γLUT correction table is replaced with a γLUT correction table at the time of power-on (S22). In the case where the image formation is not the first image formation after power-on, a γLUT correction table obtained through immediately before control by the second control system performed from the previous power-on to the power-off is used as it is as the γLUT correction table. On the basis of the thus determined γLUT correction table, table data of the LUT 25 are corrected (S23), and the table data as the result of correction are set in the LUT 25 (S24). Then, an image is outputted by use of the LUT 25 (S25). At that time, a patch is formed on the photosensitive drum 4, and a density of the patch is read (S26). Thereafter, ΔDn is calculated (S27), and an integral of ΔD=ΔD+ΔDn is obtained (S28) to prepare a γLUT correction table (S29). Thereafter, judgement whether print job is continued or not is made (S30). When the print job is continued, the processing is returned to the step (S23), and when the print job is completed, the processing is completed.

The second control system is always actuated in the case where the patch can be formed in a non-image area during ordinary image formation. More specifically, in the case of continuously outputting an A4-sized full color image, the LUT 25 is corrected one time for each color per output of two image sheets. In the case of outputting only one sheet, the LUT 25 is corrected every sheet for each color.

On the other hand, the first control system is accompanied with a human operation, so that it is difficult to consider that control by the first control system is frequently performed. Accordingly, when the image forming apparatus is installed, the service person performs the control by the first control system. Further, when there is no problem with respect to the output image, a gradation characteristic can be maintained for a certain period by the control through the second control system, and when the gradation characteristic is gradually changed, calibration (control) by the first control system can be performed. As described above, the gradation control is shared between the first and second control systems. As a result, the gradation characteristic can be appropriately maintained until the image forming apparatus reaches its end of life.

Further, it is possible to output a stable image on an image from first image formation after power-on without performing the control at the time of power-on by taking time.

Second Embodiment

Figure 29:
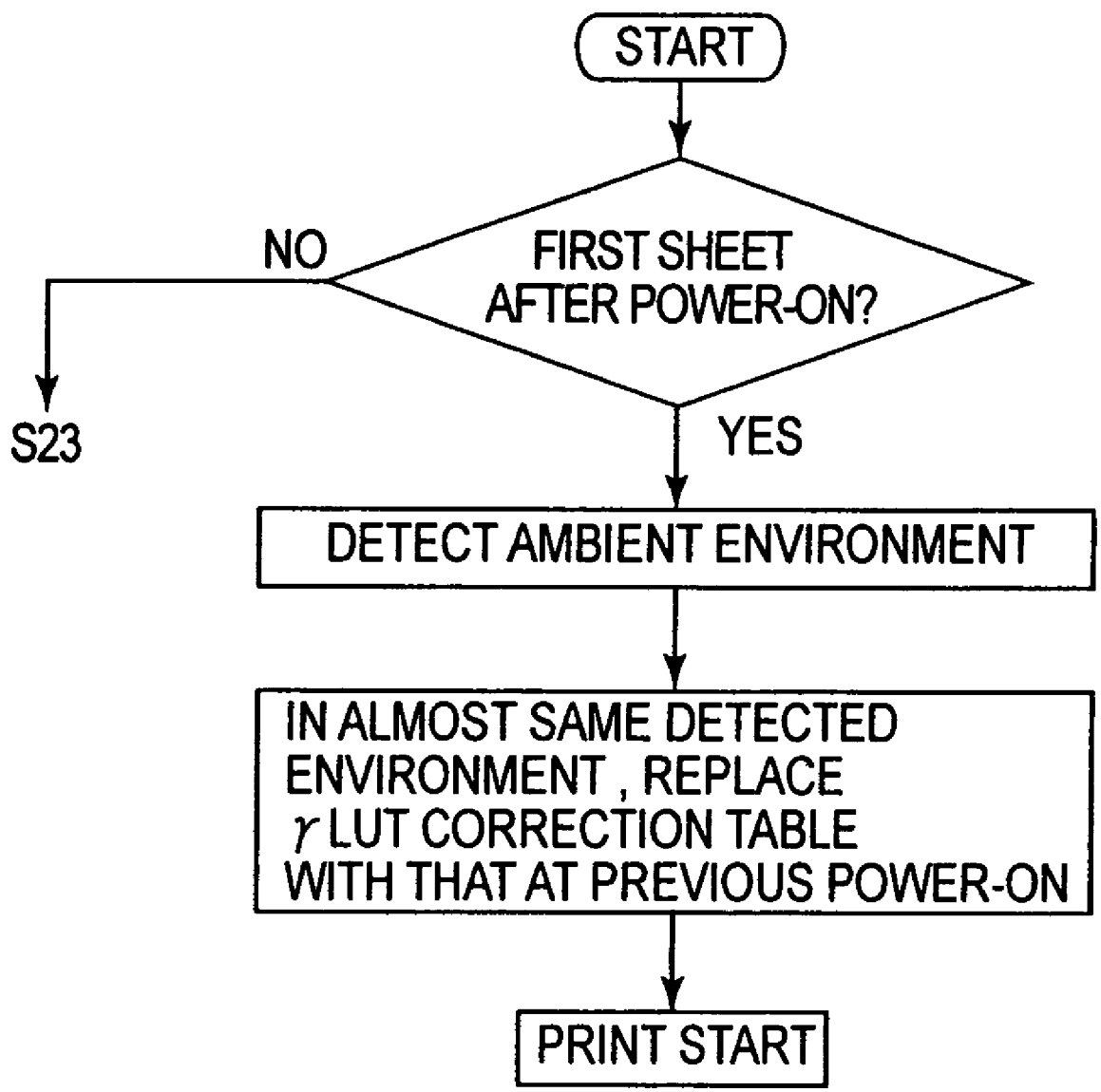

Hereinbelow, an image forming apparatus to Second Embodiment of the present invention will be described with reference to FIG. 29.

In this embodiment, with respect to the substantially same constitution as First Embodiment, identical signs are used and detailed explanation thereof will be omitted.

In First Embodiment, when first image formation after power-on is performed, the γLUT correction table first prepared after the previous power-on is used in the control by the second control system. However, in this embodiment, not the γLUT correction table first prepared after first image formation after power-on, a γLUT correction table obtained in a predetermined period, in an initial stage during the previous power-on, in which an ambient environmental condition in the image forming apparatus is substantially equal to that at the time of current power-on, is employed.

As described in First Embodiment, the γLUT correction table most suitable for the image characteristic at the time of power-on afterstanding is the γLUT correction table which first prepared after the previous power-on but it is not necessary to limit the suitable γLUT correction table to the first prepared γLUT correction table. During a period from after power-on to a lapse of predetermined time, it is possible to prepare a γLUT correction table in the substantially same state, and it is also possible to achieve the stable control by use of this γLUT correction table.

More specifically, an atmospheric environment in the image forming apparatus immediately after power-on is measured by an environmental sensor, and a γLUT correction table obtained in an initial stage during the previous power-on under the substantially same condition as the above obtained environmental condition, is selected from those stored in a storing means (memory), and is used for first image formation after current power-on.

Under some constraints, when the γLUT correction table first prepared after the previous power-on cannot be used, the γLUT correction table, described in this embodiment, which is prepared during a predetermined period from the previous power-on and is stored in the memory may be used.

The present invention is used to suppress the change in image forming condition due to standing, so that when a γLUT correction table prepared during a period in which the influence of the standing state remains is used, it is possible to effectively achieve stabilization compared with the case of using the immediately before γLUT correction table prepared after power-off.

As described above, without using such a constitution that the γLUT correction table is selected by detecting the atmospheric environment in the image forming apparatus, it is also possible to employ such a constituent that the γLUT correction table prepared during an initial period, after the previous power-on, from after the previous power-on to completion of (n)th image formation (n: integer) (specifically, n=10 in the case of continuous image formation) or during an initial period, after the previous power-on, from after the previous power-on to a lapse of a predetermined time (specifically, 10 minutes), is selected.

The initial period after the previous power-on described above is a period in which the image forming condition is affected by the standing state. For example, the initial period is a period in which a temperature and a humidity of atmosphere (the photosensitive drum 4, the developing device 3, the laser oscillation apparatus, the laser scanner, etc.) in the image forming apparatus become a steady state in which they change in a predetermined range. Alternatively, as a period in which the developer in the developing device 3 is uniformly stirred, it is possible to employ such a period that the developer in the developing device 3 is conveyed from one (full) circumference of the photosensitive drum. It is important that these periods are determined so as to match characteristics of the respective image forming apparatuses and may be set on the basis of the number of output sheets, an operating time, etc.

Third Embodiment

Figure 30:
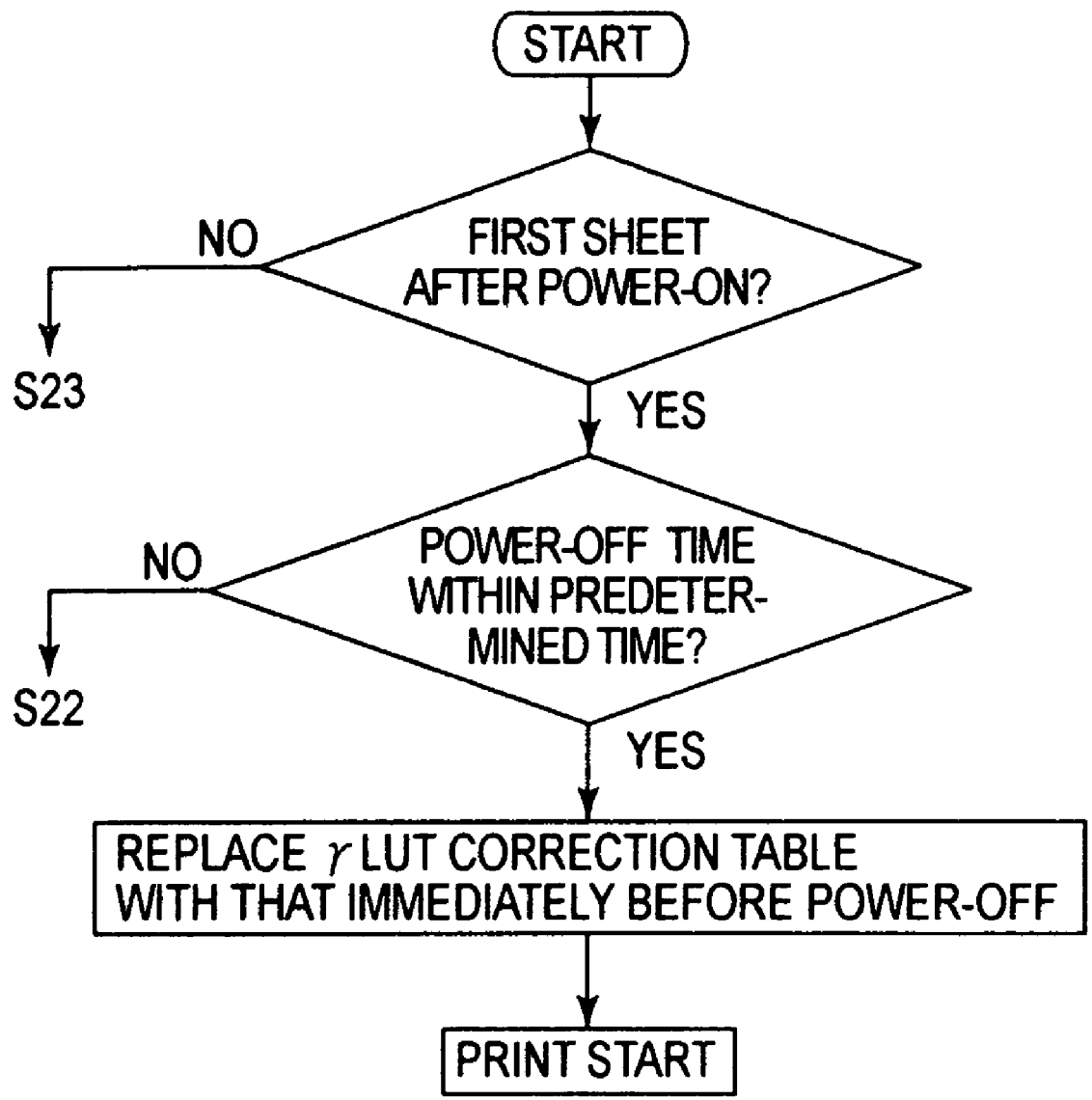

Hereinbelow, an image forming apparatus according to Third Embodiment of the present invention will be described with reference to FIG. 30.

In this embodiment, with respect to the substantially same constitution as First and Second Embodiments, identical signs are used and detailed explanation thereof will be omitted.

In this embodiment, a period of time in which the power of the image forming apparatus has been turned off is measured by a timer (actuated by an internal buttery) as a timing means. In the case where the standing time (power-off time) is short, there is no influence of the standing, so that an immediately before γLUT correction table obtained before power-off is used as a γLUT correction table to be used at the time of power-on. When the standing time is long, there is an influence of the standing. For this reason, by effecting the image gradation correction control as in the above described First and Second Embodiments, it is possible to further improve an accuracy depending on the standing time.

Incidentally, the present invention may be applied to not only a system constituted by a plurality of equipment (e.g., a host computer, interface equipment, a reader, and a printer) but also an apparatus consisting of one equipment (e.g., a copying machine or facsimile apparatus).

Further, the objects of the present invention may also be accomplished in such a manner that a storage medium (or recording medium) in which program code of software for realizing functions of the above described embodiments is recorded is supplied to a system or an image forming apparatus, and a computer (or CPU or MPU) reads out and executes the program code stored in the storage medium.

In this case, the program code itself read from the storage medium realizes the functions of the above described embodiments, so that the storage medium storing the program code constitutes the present invention. The present invention also embraces not only such a case where the computer executes the read-out program code, whereby the functions of the above described embodiments are realized but also such a case where on the basis of directions from the program code, a part or all of actual processing is executed by an operating system (OS) running on the computer, thus realizing the functions of the above described embodiments. Further, the present invention may include such a case where the program code read from the storage medium is written in a function enhancement card inserted into the computer or a memory provided to a function enhancement unit connected to the computer, and then a CPU or the like provided in the function enhancement card or the function enhancement unit executes a part or all of actual processing, whereby the functions of the above described embodiments are realized.

In the case of applying the present invention to the above described storing medium, program code corresponding to the above described flow charts is stored in the storing medium.

Incidentally, in the respective embodiments described above, the photosensitive drum is used as an example of the image bearing member for bearing an electrostatic latent image or a toner image but the present invention is applicable to a photosensitive belt which is a belt-like image bearing member having a surface photosensitive layer. Further, the present invention is also applicable to an image forming apparatus having an intermediary transfer member (e.g., an intermediary transfer belt or an intermediary transfer drum) onto which a toner image is once transferred for transferring the toner image onto the recording material 6 or a film. In these image forming apparatuses, the density information as input information for the second control system may be obtained from patches formed on the photosensitive belt or the intermediary transfer member.

In the above description, the case where the present invention is applied to the four color full color image forming apparatus according to electrophotography, as an example, but is not limited thereto. The present invention may also be similarly applied to a monochromatic (white/black) electrophotographic image forming apparatus, monochromatic and four-color full color image forming apparatuses according to, e.g., electrostatic recording other than the electrophotography, whereby a similar effect can be achieved.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 428473/2003 filed Dec. 24, 2003, which is hereby incorporated by reference.

What is claimed is:

1. An image forming apparatus, comprising:
   image forming means for forming an image pattern on the basis of image data;
   detection means for detecting a characteristic of the image pattern formed by said image forming means;
   control means for controlling an image forming condition depending on the characteristic of the image pattern detected by said detection means; and
   storing means for storing the characteristic of the image pattern detected from completion of first image formation after a main power source is turned on, to before start of (n)th image formation for a predetermined time, where n is a predetermined integer;
   wherein said control means control the image forming condition on the basis of information stored in said storing means when first image formation is performed after the main power source is turned on.

2. An apparatus according to claim 1, wherein n is 2.

3. An apparatus according to claim 2, wherein said control means controls an image forming condition depending on a characteristic of an immediately before image pattern detected after the main power source is turned on when second and subsequent image formation is performed after the main power source is turned on.

4. An apparatus according to claim 1 or 2, wherein when first image formation after the main power source is turned on is performed, on the basis of a power-off time of the main power source, said control means selects a mode in which the image forming condition is controlled on the basis of a characteristic of the latent image pattern detected before the main power source is turned off or a mode in which the image forming condition is controlled on the basis of a characteristic of an image pattern detected, after the main power source is turned on for a previous image formation, from completion of first image formation to before start of image formation for a predetermined time.

5. An apparatus according to claim 1, wherein a period from when the main power source is turned on to when the (n)th image formation for a predetermined time is started, is a transition period until a state of an ambient environment in said image forming apparatus becomes a steady state.

6. An apparatus according to claim 1, wherein said controlled means controls the image forming condition for correcting an image gradation level.

7. An image forming apparatus, comprising:
   image forming means for forming an image pattern on the basis of image data;
   detection means for detecting a characteristic of the image pattern formed by said image forming means;
   control means for controlling an image forming condition depending on the characteristic of the image pattern detected by said detection means; and
   storing means for storing the characteristic of the image pattern detected by said detection means;
   wherein said control means controls the image forming condition on the basis of a characteristic of an image pattern detected under an ambient environmental condition equivalent to that when the main power source is turned on for current image formation, after the main power source is turned on for previous image formation when first image formation is performed after the main power source is turned on.

8. An apparatus according to claim 7, wherein said control means controls an image forming condition on the basis of a characteristic of an immediately before image pattern detected after the main power source is turned on when second and subsequent image formation is performed after the main power source is turned on.

9. An apparatus according to claim 7, wherein said control means controls the image forming condition for correcting an image gradation level.

* * * * *

UNITED STATES PATENT AND TRADEMARK OFFICE
CERTIFICATE OF CORRECTION

PATENT NO. : 7,187,879 B2
APPLICATION NO. : 11/016881
DATED : March 6, 2007
INVENTOR(S) : Nobuhiko Zaima It is certified that error appears in the above-identified patent and that said Letters Patent is hereby corrected as shown below:

ON THE TITLE PAGE:
Item (57), Abstract, Line 2, "leftstanding" should read --left standing--.

IN THE DRAWINGS:
Sheet No. 22, Figure 27, "PRERARE" should read --PREPARE--.

COLUMN 1:
Line 38, "red" should read --read--.
Line 45, "requires" should read --require--.
Line 54, "has" should read --has been--.

COLUMN 2:
Line 48, "of" (first occurrence) should be deleted.
Line 50, "a" should be deleted.

COLUMN 3:
Line 50, "appropriate" should read --appropriately--.

COLUMN 4:
Line 10, "These" should read --This--.

COLUMN 5:
Line 7, "wide" should read --width--.
Line 39, "Includes" should read --includes--.

COLUMN 7:
Line 59, "din" should read --in--.

COLUMN 8:
Line 24, "massage" should read --message--, and "for" should be deleted.
Line 25, "guidance is displayed on the display device" should be deleted.

COLUMN 9:
Line 48, "rid" should read --grid--.
Line 63, "as" should read --so as--.

UNITED STATES PATENT AND TRADEMARK OFFICE
CERTIFICATE OF CORRECTION

PATENT NO. : 7,187,879 B2
APPLICATION NO. : 11/016881
DATED : March 6, 2007
INVENTOR(S) : Nobuhiko Zaima It is certified that error appears in the above-identified patent and that said Letters Patent is hereby corrected as shown below:

COLUMN 10:
Line 39, "display don" should read --displayed on--.
Line 46, "This" should read --These--.
Line 48, "thin" should read --thinned--.
Line 66, "out-" should read --be out--.

COLUMN 11:
Line 11, "WHen" should read --When--.
Line 21, "FIG. 12" should read --FIG. 12)--.
Line 54, "when" should be deleted.

COLUMN 14:
Line 54, "immediately before" should read --the immediately preceding--.
Line 56, "before" should read --preceding--.
Line 57, "a γLUT" should read --but a γLUT--.
Line 58, "(controls) performed" should read --(controls) is performed--.
Line 61, "leftstanding" should read --left standing--.

COLUMN 15:
Line 9, "preparation"." should read --preparation," is carried out.--.

UNITED STATES PATENT AND TRADEMARK OFFICE
CERTIFICATE OF CORRECTION

PATENT NO.        : 7,187,879 B2
APPLICATION NO.   : 11/016881
DATED             : March 6, 2007
INVENTOR(S)       : Nobuhiko Zaima It is certified that error appears in the above-identified patent and that said Letters Patent is hereby corrected as shown below:

COLUMN 16:
Line 7, "to" should read --according to the--.
Line 18, "a γLUT" should read --but a γLUT--.
Line 24, "afterstanding" should read --after standing--.
Line 25, "first" should read --was first--.

Signed and Sealed this

Third Day of June, 2008

JON W. DUDAS
*Director of the United States Patent and Trademark Office*